(12) United States Patent
Yoshida et al.

(10) Patent No.: US 10,747,375 B2
(45) Date of Patent: Aug. 18, 2020

(54) TOUCH SENSOR

(71) Applicant: FUJIFILM Corporation, Tokyo (JP)

(72) Inventors: Masafumi Yoshida, Kanagawa (JP); Nobuyuki Tada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 15/794,961

(22) Filed: Oct. 26, 2017

(65) Prior Publication Data
US 2018/0046283 A1 Feb. 15, 2018

Related U.S. Application Data

(63) Continuation of application No. PCT/JP2016/063860, filed on May 10, 2016.

(30) Foreign Application Priority Data

May 19, 2015 (JP) ................... 2015-102219

(51) Int. Cl.
*G06F 3/044* (2006.01)
*H01Q 1/22* (2006.01)
(Continued)

(52) U.S. Cl.
CPC ........... *G06F 3/044* (2013.01); *H01Q 1/1271* (2013.01); *H01Q 1/22* (2013.01); *H01Q 1/243* (2013.01);
(Continued)

(58) Field of Classification Search
CPC ........ G06F 3/041; H01Q 1/1271; H01Q 1/22; H01Q 1/243; H01Q 1/38; H01Q 1/44; H01Q 13/106
(Continued)

(56) References Cited

U.S. PATENT DOCUMENTS 6,241,920 B1 * 6/2001 Cotter ................. G02B 6/4416
264/1.24
6,291,918 B1 * 9/2001 Umeda .................. H02K 1/165
310/215
(Continued)

FOREIGN PATENT DOCUMENTS

JP H09-147639 A 6/1997
JP 2009-280905 A 12/2009
(Continued)

OTHER PUBLICATIONS

Antenna opening ratio The handbook of Antenna Design by Alan W Rudge, K Milne, A. D. Oliver 1982 p. 23.*
(Continued)

*Primary Examiner* — Prabodh M Dharia
(74) *Attorney, Agent, or Firm* — Studebaker & Brackett PC

(57) ABSTRACT

An antenna has a visible light transparent substrate, and a pattern including metal fine wires provided on the visible light transparent substrate and having a plurality of opening portions. In the pattern, a line width of the metal fine wire is 0.5 to 5.0 μm, an opening ratio is 70% or greater, and surface electrical resistance is 9 Ω/sq. or less. A method of manufacturing an antenna has a step of forming a pattern in which a line width of metal fine wires is 0.5 to 5.0 μm, and an opening ratio is 70% or greater by an electroless copper plating treatment. A touch sensor has a touch sensor unit which is provided in a visible light transparent substrate and which includes at least a detection electrode in which a plurality of opening portions are formed of conductive fine wires, and at least one antenna provided on the substrate.

5 Claims, 4 Drawing Sheets

(51) Int. Cl.
*H01Q 1/12* (2006.01)
*H01Q 1/24* (2006.01)
*H01Q 1/38* (2006.01)
*H01Q 1/44* (2006.01)
*H01Q 13/10* (2006.01)

(52) U.S. Cl.
CPC ................ *H01Q 1/38* (2013.01); *H01Q 1/44* (2013.01); *H01Q 13/106* (2013.01); *G06F 2203/04103* (2013.01); *G06F 2203/04112* (2013.01)

(58) Field of Classification Search
USPC ............... 345/1.3, 156, 174; 174/253, 389; 349/12; 361/748
See application file for complete search history.

(56) References Cited

U.S. PATENT DOCUMENTS

| | | | | |
|---|---|---|---|---|
| 6,684,030 | B1* | 1/2004 | Taylor | H04B 10/25751 |
| | | | | 398/59 |
| 10,219,388 | B2* | 2/2019 | Tyler | H01L 21/6835 |
| 2007/0040746 | A1 | 2/2007 | Song et al. | |
| 2007/0252258 | A1* | 11/2007 | Shimada | H01L 27/0203 |
| | | | | 257/678 |
| 2009/0051620 | A1 | 2/2009 | Ishibashi et al. | |
| 2009/0269599 | A1 | 10/2009 | Tsurumi | |
| 2010/0206628 | A1* | 8/2010 | Matsui | H01J 11/10 |
| | | | | 174/389 |
| 2011/0124252 | A1* | 5/2011 | Shimomura | C23C 18/02 |
| | | | | 442/1 |
| 2012/0032907 | A1* | 2/2012 | Koizumi | G06F 3/0488 |
| | | | | 345/173 |
| 2012/0058676 | A1* | 3/2012 | Schaffer | H01F 5/003 |
| | | | | 439/620.21 |
| 2012/0262414 | A1 | 10/2012 | Lai | |
| 2013/0050331 | A1 | 2/2013 | Kaeriyama et al. | |
| 2013/0050365 | A1 | 2/2013 | Irita | |
| 2013/0294037 | A1* | 11/2013 | Kuriki | H05K 9/00 |
| | | | | 361/748 |
| 2014/0104157 | A1* | 4/2014 | Burns | H01Q 1/243 |
| | | | | 345/156 |
| 2014/0168543 | A1* | 6/2014 | Hwang | G06F 3/041 |
| | | | | 349/12 |
| 2014/0238730 | A1* | 8/2014 | Nakamura | B32B 15/14 |
| | | | | 174/253 |
| 2014/0299361 | A1 | 10/2014 | Nakamura et al. | |
| 2014/0313005 | A1* | 10/2014 | Bang | H01F 41/041 |
| | | | | 336/200 |
| 2014/0347837 | A1 | 11/2014 | Kariya et al. | |
| 2015/0138151 | A1* | 5/2015 | Moran | G06F 3/0412 |
| | | | | 345/174 |
| 2015/0310963 | A1* | 10/2015 | Markham | H01B 1/02 |
| | | | | 427/118 |
| 2016/0132281 | A1* | 5/2016 | Yamazaki | G06F 3/1446 |
| | | | | 345/1.3 |
| 2017/0057389 | A1* | 3/2017 | Dickerman | B60N 2/70 |
| 2017/0352959 | A1* | 12/2017 | Sugita | H01Q 1/24 |
| 2019/0165486 | A1* | 5/2019 | Yoshida | H01Q 3/36 |

FOREIGN PATENT DOCUMENTS

| | | |
|---|---|---|
| JP | 2011-129501 A | 6/2011 |
| JP | 2013-005013 A | 1/2013 |
| JP | 2013-043945 A | 3/2013 |
| JP | 2013-043946 A | 3/2013 |
| JP | 2013-149236 A | 8/2013 |
| JP | 2013-257755 A | 12/2013 |
| JP | 5486536 B2 | 5/2014 |
| JP | 2014-159620 A | 9/2014 |
| JP | 2014-197531 A | 10/2014 |
| JP | 2015-082178 A | 4/2015 |
| WO | 2006/106982 A1 | 10/2006 |

OTHER PUBLICATIONS

Antenna_openign_ratio The handbook of Antenna Design by Alan W Rudge, K Milne, A. D. Oliver 1982 p. 23.*
An Office Action mailed by the Japanese Patent Office dated Jul. 3, 2018, which corresponds to Japanese Patent Application No. 2015-102219 and is related to U.S. Appl. No. 15/794,961.
International Search Report issued in PCT/JP2016/063860; dated Jul. 26, 2016.
Written Opinion issued in PCT/JP2016/063860; dated Jul. 26, 2016.
"Plastic Method for Determining Total Light Transmittance and Total Light Reflectance"; Japanese Industrial Standards; 2008; pp. 1-9; JIS K 7375.

* cited by examiner

TOUCH SENSOR

CROSS-REFERENCE TO RELATED APPLICATIONS

This application is a Continuation of PCT International Application No. PCT/JP2016/063860 filed on May 10, 2016, which claims priority under 35 U.S.C. § 119(a) to Japanese Patent Application No. 2015-102219 filed on May 19, 2015. The above application is hereby expressly incorporated by reference, in its entirety, into the present application.

BACKGROUND OF THE INVENTION

1. Field of the Invention

The present invention relates to an antenna used in a mobile terminal device having a touch sensor, which is called a smart phone, a tablet, or a smart watch, a method of manufacturing an antenna, and a touch sensor, and particularly relates to an antenna having small occupation of a volume of a mobile terminal device, low visibility, and satisfactory sensitivity, a method of manufacturing an antenna, and a touch sensor.

2. Description of the Related Art

Currently, advance in function, miniaturization, thinning, and weight reduction of a mobile terminal device having a touch sensor, which is called a smart phone, a tablet, a smart watch, or the like are proceeded. Since these mobile terminal devices use a plurality of communication bands, a plurality of antennae corresponding to the communication band are required. For example, a plurality of antennae such as telephone antenna, a Wireless Fidelity (WiFi) antenna, a 3G (Generation) antenna, a 4G (Generation) antenna, a long term evolution (LTE) antenna, and a Bluetooth (registered trademark) antenna are equipped with the mobile terminal device.

However, as in a mobile terminal device 100 illustrated in FIG. 10, the development of the mobile terminal device proceeds towards reducing a frame portion 102a of a housing 102 including the aforementioned antenna (not illustrated), and a degree of freedom of the design is narrowed down. In a case where a hand comes into contact with a frame portion 102a of the mobile terminal device 100 in a case of communication, there is a problem in that sensitivity of the antenna is prominently deteriorated. In FIG. 10, a reference numeral 104 indicates a display screen.

Therefore, an antenna provided in the central portion of the mobile terminal device is desired, and a chip antenna with a small size is developed, but the characteristics of the antenna sensitivity are deteriorated, robustness is low, and the deterioration of the antenna sensitivity is not solved. As a substitution of the chip antenna described above, a sheet-like antenna is developed.

In JP2013-257755A, a communication sheet obtained by disposing gold fine particles in a mesh shape by using a dispersing agent and bonding the gold fine particles on a resin, so as to perform transcription is disclosed. The surface electrical resistance of the communication sheet in JP2013-257755A is 15 to 900 Ω/sq.

A display transparent antenna of WO2006/106982A includes a sheet-like transparent substrate having insulating properties and an antenna pattern formed in a surface shape on a front surface of the transparent substrate, in which a conductive portion of the antenna pattern is formed of a conductive thin film in a mesh structure, an outline of each mesh is an extra-fine band having a substantially equal band width, and a light transmittance of an antenna pattern forming portion is 70% or greater. In the antenna pattern, the band width of the extra-fine band is 15 to 30 μm. The antenna pattern is formed by forming a transparent anchor layer in which an electroless plating catalyst is dispersed, performing electroless plating and an electroplating treatment, and patterning by using a photomask. In addition to this, an antenna pattern is formed by patterning a copper foil by using a photomask.

SUMMARY OF THE INVENTION

In JP2013-257755A, there is a problem in that surface electrical resistance is 15 to 900 Ω/sq. due to the existence of the dispersing agent used in dispersion of the gold fine particles, and surface electrical resistance is high for the use in an antenna.

In the display transparent antenna in WO02006/106982A, a band width of the extra-fine band is 15 to 30 μm, and is a width that can be visually recognized. In WO2006/106982A, there is a problem in that, in a case where the band width of the extra-fine band is narrowed down, and electroplating is performed, ignition occurs, and thus it is difficult to narrow down the band width.

The purpose of the present invention is to solve the problems in the related art described above and to provide an antenna having low visibility, satisfactory sensitivity, and low occupation of a volume in a device provided with the antenna, a method of manufacturing an antenna, and a touch sensor.

In order to achieve the purposes described above, a first aspect of the invention is to provide an antenna comprising: a visible light transparent substrate; and a pattern including metal fine wires provided on the visible light transparent substrate and having a plurality of opening portions, in which, in the pattern, a line width of the metal fine wire is 0.5 to 5.0 μm, an opening ratio is 70% or greater, and surface electrical resistance is 9 Ω/sq. or less.

It is preferable that the metal fine wires contain copper.

A second aspect of the invention is to provide a method of manufacturing an antenna including a pattern including metal fine wires provided on a visible light transparent substrate and having a plurality of opening portions, and the method includes a step of forming the pattern in which a line width of the metal fine wires is 0.5 to 5.0 μm, and an opening ratio is 70% or greater by an electroless copper plating treatment.

It is preferable that in the step of forming the pattern, an additive method is used.

A third aspect of the invention is to provide a touch sensor comprising: a visible light transparent substrate; a touch sensor unit which is provided on the visible light transparent substrate and which includes at least a detection electrode in which a plurality of opening portions are formed by using conductive fine wires; and at least one antenna which is provided on the substrate, in which the antenna has a pattern including metal fine wires and having a plurality of opening portions, in which, in the pattern, a line width of the metal fine wires is 0.5 to 5.0 μm, an opening ratio is 70% or greater, and surface electrical resistance is 9 Ω/sq. or less, and in which the touch sensor unit and the pattern have different opening ratios.

It is preferable that a plurality of the antennae are provided, the touch sensor unit and each of the antennae have different opening ratios, and three or more areas having different opening ratios are provided.

It is preferable that, among the conductive fine wires and the metal fine wires, at least the metal fine wires contain copper.

According to the antenna and the method of manufacturing an antenna of the present invention, it is possible to obtain an antenna having low visibility, satisfactory sensitivity, and low occupation of a volume in a device provided with the antenna.

According to the touch sensor of the present invention, it is possible to cause a touch sensor to have an antenna having low visibility, satisfactory sensitivity, and low occupation of a volume in a device provided with the antenna.

DESCRIPTION OF THE PREFERRED EMBODIMENTS

An antenna, a method of manufacturing an antenna, and a touch sensor according to the present invention are specifically described, based on the suitable embodiment illustrated in the accompanying drawings.

The expression "to" indicating a numerical range below includes numerical values indicated on both sides thereof. For example, the expression "ε is a numerical value α to a numerical value β" means that the range of "ε" is a range including a numerical value α and a numerical value β, and in a case where the range is indicated with a mathematical symbols, $\alpha \leq \varepsilon \leq \beta$.

The expression "visible light transparent" and simply "transparent" mean that the light transmittance is at least 60% or greater, preferably 75% or greater, and more preferably 80% or greater in the visible light wavelength range of 400 to 800 nm, Still more preferably 85% or more.

The light transmittance is measured, for example, by using a method of "Plastic-Measurement way of total light transmittance and total light reflectance" defined in JIS K 7375: 2008.

Figure 1:
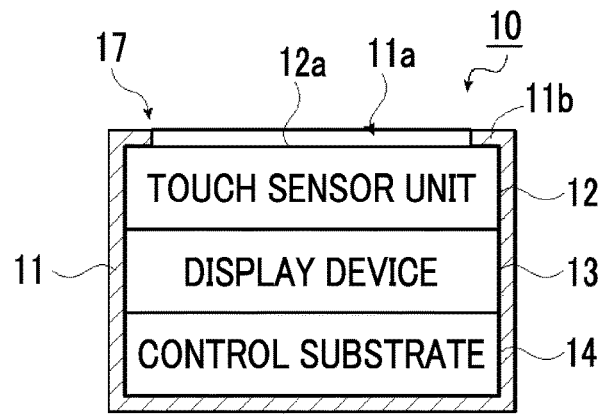
FIG. 1 is a schematic diagram illustrating a configuration of a mobile terminal device having a touch sensor panel of an embodiment according to the present invention.
Figure 2:
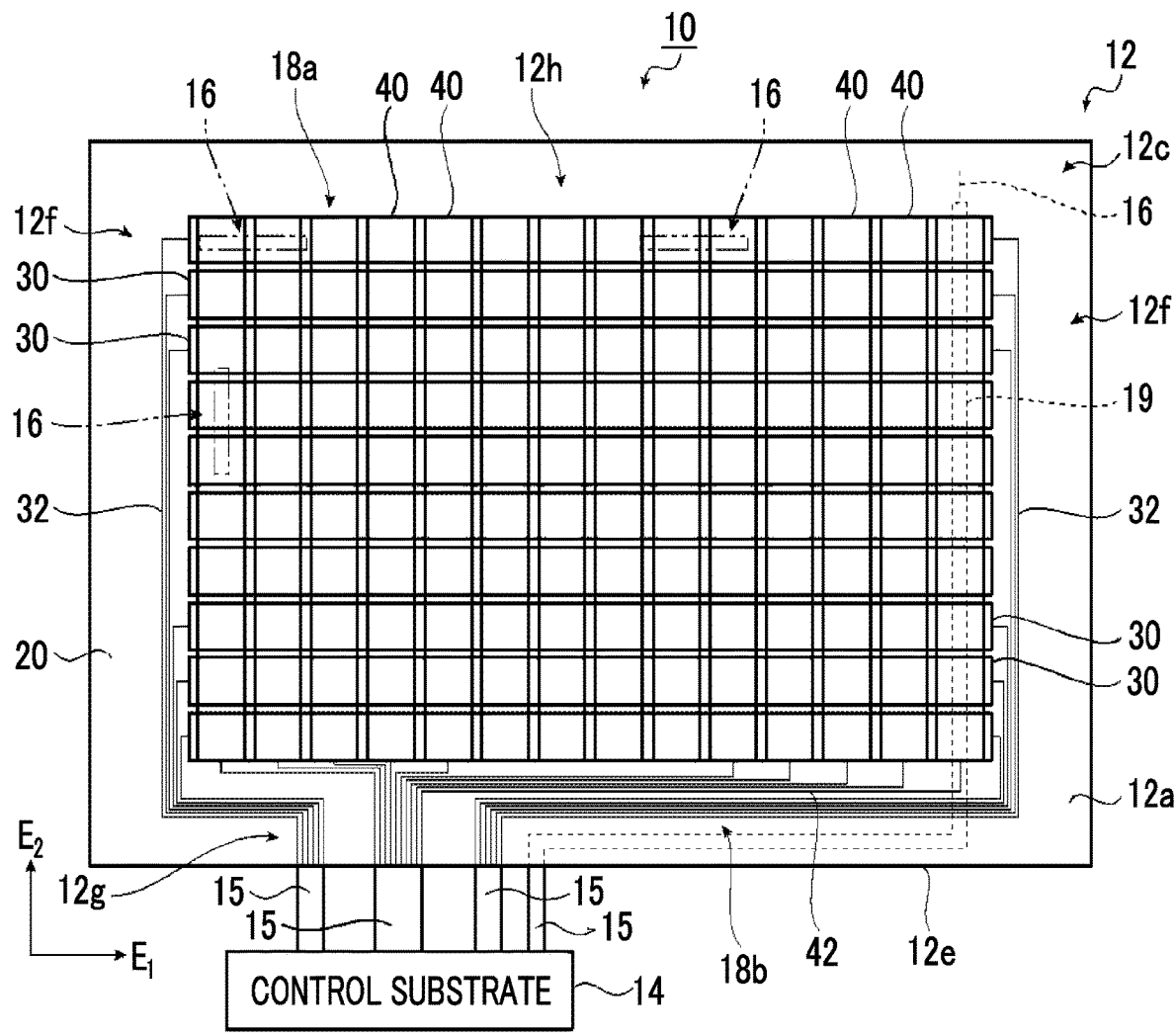
FIG. 2 is a schematic plan view illustrating a touch sensor panel of an embodiment according to the present invention.

FIG. 1 is a schematic diagram illustrating a configuration of a mobile terminal device having a touch sensor panel of an embodiment according to the present invention, and FIG. 2 is a schematic plan view illustrating a touch sensor panel of an embodiment according to the present invention.

The touch sensor panel according to the present invention is used in the mobile terminal device equipped with a touch sensor, and the description is made providing this as an example. The use of the touch sensor panel according to the present invention is not limited to the mobile terminal device. The mobile terminal device is called, for example, a smart phone, a tablet, or a smart watch.

As illustrated in FIG. 1, a touch sensor panel 10 according to the present embodiment is used together with a display device 13 such as a liquid crystal display device and is provided on the display device 13. Therefore, in the touch sensor panel 10, an area corresponding to a displayed image of the display device 13 is transparent in ordered to cause the image displayed on the display device 13 to be recognized. The display device 13 is not particularly limited, as long as a predetermined image can be displayed on a screen including a motion picture and the like. In addition to the liquid crystal display device described above, for example, an organic electro luminescence (organic EL) display device, an electronic paper, and the like can be used.

The touch sensor panel 10 and the display device 13 are included in communicable a mobile terminal device 17 equipped with a touch sensor, and a functional layer such as an antireflection layer may be applied to the touch sensor panel 10.

The touch sensor panel 10 illustrated in FIG. 2 includes a touch sensor unit 12 and a control substrate 14 that controls the touch sensor unit 12. The display device 13 is provided between the touch sensor unit 12 and the control substrate 14 as illustrated in FIG. 1. An antenna 16 is provided on a corner portion 12c of the touch sensor unit 12 as illustrated in FIG. 2.

The touch sensor unit 12, the display device 13, and the control substrate 14 are stored in a housing 11.

In the housing 11, an opening portion 11a is provided in an area corresponding to a front surface 12a of the touch sensor unit 12. The opening portion 11a of the housing 11 has a tendency that the size thereof increases in order to protect an display area of the display device 13, and the width of a frame portion 11b on an outer edge of the touch sensor unit 12 is narrow.

As illustrated in FIG. 2, the touch sensor unit 12 and the control substrate 14 are electrically connected to each other, for example, via a flexible printed wiring substrate (FPC (flexible printed circuits)) 15. The electric connection between the touch sensor unit 12 and the control substrate 14 is not limited to a flexible printed wiring substrate 15, and the electric connection may be performed with a connector (not illustrated). The antenna 16 may be electrically connected to the control substrate 14 via a transmission line unit 19 and the flexible printed wiring substrate 15.

The control substrate 14 includes a control circuit (not illustrated) that performs control of the display device 13, control of the touch sensor unit 12, and control of data communication via the antenna 16. The control circuit, for example, includes an electronic circuit. A transmission signal is transmitted from the antenna 16 by the control substrate 14, the received signals can be received, and thus information can be transmitted and received from external devices.

In a case where a sensor unit 18a described after the touch sensor unit 12 is touched with a finger, if a touched position is an electronic capacitance type, the change of the electronic capacitance occurs, this change of electronic capacitance is detected by the control substrate 14, and coordinates of the touched position is specified. The control substrate 14 includes well known general touch sensors used for position detection. In a case where the touch sensor unit 12 is an electronic capacitance type, an electronic capacitance-type control circuit is used. In a case where the touch sensor unit 12 is a resistance membrane type, a resistance membrane type control circuit is suitably used.

In the control substrate 14, as a control circuit controlling the display device 13 and a control circuit controlling data communication, well-known control circuits are suitably used.

An $E_1$ axis direction and an $E_2$ axis direction illustrated in FIG. 2 are orthogonal to each other. In the touch sensor unit 12 of the touch sensor panel 10, a plurality of first conductive layers 30 extending in the $E_1$ axis direction are provided with an interval in the $E_2$ axis direction. A plurality of second conductive layers 40 extending in the $E_2$ axis direction are provided with an interval in the $E_1$ axis direction.

Each of the first conductive layers 30 is electrically connected to first wiring 32 at an end thereof.

Each of the second conductive layers 40 is electrically connected to second wiring 42 at an end thereof.

With respect to a portion of the first conductive layers 30, illustration of the connected first wiring 32 is omitted. With respect to a portion of the second conductive layers 40, illustration of the connected second wiring 42 is omitted.

Each piece of the first wiring 32 and each piece of the second wiring 42 are aggregated in a wire connection area 12*g* of a lower end portion 12*e* of a substrate 20 and are respectively connected to the control substrate 14 by the flexible printed wiring substrate 15.

Each of the first conductive layers 30 and the second conductive layers 40 functions as a detection electrode that detects a touch on the touch sensor panel 10. The sensor unit 18*a* that detects a touch is provided on the first conductive layers 30 and the second conductive layers 40. The first wiring 32 and the second wiring 42 are collectively referred to as an edge part wiring unit 18*b*.

The first conductive layers 30 and the second conductive layers 40 have the same configuration, and the first wiring 32 and the second wiring 42 have the same configuration.

Figure 3:
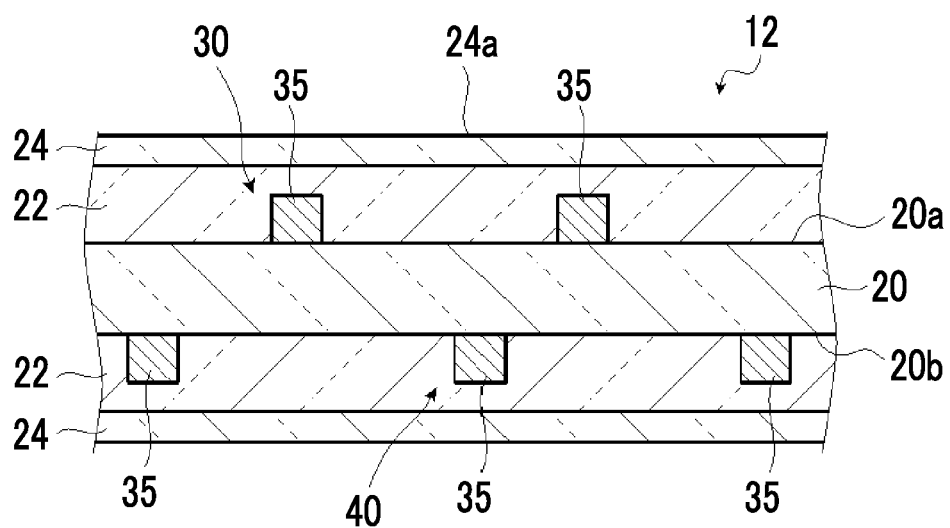
FIG. 3 is a schematic cross-sectional view illustrating a touch sensor panel of an embodiment according to the present invention.

As illustrated in FIG. 3, in the touch sensor unit 12, the first conductive layers 30 are formed on a front surface 20*a* of the substrate 20, and the second conductive layers 40 are formed on a back surface 20*b* of the substrate 20. A protective layer 24 is provided on the first conductive layers 30 via an adhesive layer 22, and the protective layer 24 is provided on the second conductive layers 40 via the adhesive layer 22.

The first wiring 32 is formed on the front surface 20*a* of the substrate 20 on which the first conductive layers 30 are formed, though not illustrated in FIG. 3. The second wiring 42 is formed on the back surface 20*b* of the substrate 20 on which the second conductive layers 40 are formed, though not illustrated in FIG. 3.

In a case where the first conductive layers 30 are formed on the front surface 20*a* on one substrate 20 and the second conductive layers 40 are formed on the back surface 20*b*, deviation in positional relation between the first conductive layers 30 and the second conductive layers 40 can be reduced even though the substrate 20 shrinks.

The touch sensor panel 10, for example, may include one conductive layer on one substrate 20. In the touch sensor unit 12 illustrated in FIG. 4, one substrate 20 in which the first conductive layers 30 are formed on the back surface 20*b* and one substrate 20 on which the second conductive layers 40 are formed on the back surface 20*b* are laminated via the adhesive layer 22 such that the first conductive layers 30 face the front surface 20*a* of the substrate 20 on which the second conductive layers 40 are formed. The substrate 20 on which the second conductive layers 40 are formed is laminated on a substrate 21 via the adhesive layer 22. The substrate 21 has the same configuration as that of the substrate 20. In the touch sensor unit 12 of FIG. 4, the front surface 20*a* of the substrate 20 becomes the frontest surface, and thus the protective layer 24 may not be provided.

Figure 5:
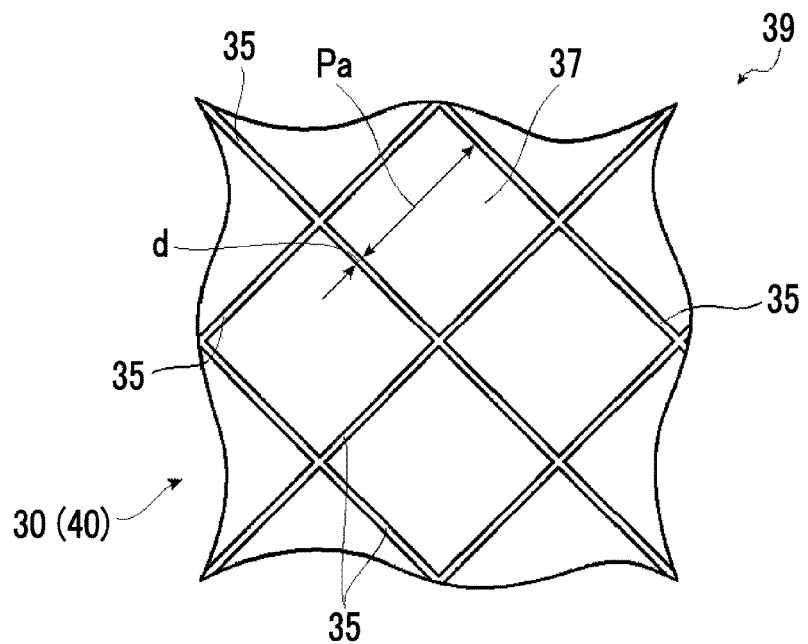
FIG. 5 is a plan view illustrating an example of a conductive pattern formed of conductive fine wires.

As illustrated in FIG. 5, the first conductive layers 30 and the second conductive layers 40 respectively include conductive fine wires 35.

A line width d of the conductive fine wire 35 is preferably 0.1 µm to 5 µm and more preferably 0.5 µm to 4 µm. In a case where the line width d of the conductive fine wires 35 has the range described above, the first conductive layers 30 and the second conductive layers 40 can be caused to have comparatively low resistance.

The thickness of the conductive fine wire 35 is not particularly limited, but the thickness thereof is preferably 0.1 µm to 10 µm and most preferably 0.5 µm to 5 µm. In a case where the thickness is in the range described above, it is possible to easily obtain the first conductive layers 30 and the second conductive layers 40 having low resistance and excellent durability.

The line width d of the conductive fine wires 35 and the thickness of the conductive fine wires 35 can be measured, for example, by using an optical microscope, a laser microscope, or a digital microscope.

In FIG. 2, all of the first conductive layers 30 and the second conductive layers 40 are schematically illustrated as bar shapes. However, as illustrated in FIG. 5, for example, the first conductive layers 30 and the second conductive layers 40 have a mesh pattern 39 obtained by combining a plurality of cells 37 including the conductive fine wires 35.

Each of the cells 37, for example, has a polygonal shape. Examples of the polygonal shape include a triangle, a quadrangle such as a square, a rectangle, a parallelogram, and a rhombus, a pentagon, a hexagon, and a random polygonal shape. A portion of sides forming the polygonal shape may be a curved line.

In a case where a length Pa of one side of the cell 37 of the mesh pattern 39 is too short, there is a problem in that, an opening ratio and a light transmittance decrease, and accordingly transparency is deteriorated. In contrast, in a case where the length Pa of one side of the cell 37 is too long, it is likely that the touch position cannot be detected due to high resolution.

The length Pa of one side of the cell 37 of the mesh pattern 39 is not particularly limited, and the length Pa thereof is preferably 50 to 500 µm and more preferably 100 to 400 µm. In a case where the length Pa of one side of the cell 37 is in the range described above, the transparency can be maintained in a satisfactory manner. In a case where the cell 37 is attached to the front surface of the display device, the display can be recognized comfortably.

In view of visible light transmittance, an opening ratio of the mesh pattern 39 formed with the conductive fine wires 35 is preferably 80% or greater, more preferably 85% or greater, and most preferably 90% or greater. The opening ratio is a ratio in which a translucent portion excluding the conductive fine wires 35 occupies with respect to the entire mesh pattern 39.

In a case where the first conductive layers 30 and the second conductive layers 40 are caused to have a mesh structure in which the conductive fine wires 35 intersect with each other in a mesh shape, the resistance becomes low, and breaking of wire hardly occurs. Even in a case where wires break, an influence on the resistance value of a detection electrode can be reduced.

In a case of the mesh structure, the mesh shape may be a regular shape in which the same shape is regularly arranged or may be a random shape. In a case of the regular shape, a square, a rhombus, and a regular hexagon are preferable, and a rhombus is particularly preferable. In a case of a rhombus, an angle of an acute angle is preferably 50° to 80°, in view of reducing moire with a display device. The mesh pitch is preferably 50 μm to 500 μm and an opening ratio of the mesh is preferably 82% to 99%. The opening ratio of the mesh is defined by an unoccupied area ratio of conductor thin wires in a mesh portion.

As the meshed metal electrode, network-shaped meshed metal electrodes as disclosed in JP2011-129501A and JP2013-149236A can be used. In addition to these, for example, a detection electrode used in an electronic capacitance-type touch sensor can be suitably used.

The length Pa of one side of the cell 37, an angle of the mesh, and an opening ratio of the mesh can be measured, for example, by using an optical microscope, a laser microscope, and a digital microscope.

The thickness of the edge part wiring unit 18b is not particularly limited, and the thickness is preferably 0.1 μm to 0.2 mm and most preferably 0.5 μm to 35 μm. In a case where the thickness is in the range described above, it is possible to comparatively easily obtain the first wiring 32 and the second wiring 42 with low resistance and excellent durability.

The thickness of the edge part wiring unit 18b can be measured by using an optical microscope, a laser microscope, and a digital microscope, in the same manner as in the conductive fine wires 35.

The conductive fine wires 35 included in the first conductive layers 30 and the second conductive layers 40, metal fine wires 50 included in the antenna 16 (see FIGS. 6 and 7), the edge part wiring unit 18b, and the transmission line unit 19 are, for example, include metal, those generally used with a conductor are suitably used as the metal, and the composition thereof is not particularly limited. The conductive fine wires 35, the metal fine wires 50, the edge part wiring unit 18b, and the transmission line unit 19 are formed, for example, with gold (Au), silver (Ag), copper (Cu), nickel (Ni), titanium (Ti), palladium (Pd), platinum (Pt), aluminum (Al), tungsten (W), or molybdenum (Mo). However, gold, silver, and copper are more preferable and purity of the metal is most preferably 80% or greater. In view of migration, copper is most preferable. An alloy of the metal described above may be used, and the metal described above is included in an alloy or metal as described below according to the present invention. The conductive fine wires 35, the edge part wiring unit 18b, and the transmission line unit 19, for example, may include a compound, and specifically include indium tin oxide (ITO).

The conductive fine wires 35, the metal fine wires 50, the edge part wiring unit 18b, and the transmission line unit 19 may include those further including a binder in addition to gold (Au), silver (Ag), or copper (Cu), and these are also included in the conductive fine wires 35, the metal fine wires 50, the edge part wiring unit 18b, and the transmission line unit 19. In a case where the conductive fine wires 35, the metal fine wires 50, the edge part wiring unit 18b, and the transmission line unit 19 include a binder, a bending process can be easily performed, and bending resistance is increased. As the binder, those used for wiring of a conductive film can be appropriately used, and for example, binders disclosed in JP2013-149236A can be used. In a case where the conductive fine wires 35 and the metal fine wires 50 include metal or an alloy, the conductive fine wires 35 and the metal fine wires 50 are metal fine wires.

It is preferable that the conductive fine wires 35 and the metal fine wires 50 preferably contains copper (Cu). The expression containing copper includes an aspect of a copper alloy and an aspect of including a binder as described above, in addition to including a single substance of copper.

The conductive fine wires 35 and the metal fine wires 50 may have an aspect of containing metal fine particles, but it is preferable not to include metal fine particles.

The substrate 20 has two main surfaces and, for example, includes a visible light transparent substrate. Since a conductive layer and the like is formed in the substrate 20, the conductive layer include an electrical insulating material. The substrate 20 may have flexibility. The expression "visible light transparent" is as described above.

As the substrate 20, for example, those having flexibility such as a plastic film and a plastic plate can be used. For example, the plastic film and the plastic plate include polyesters such as polyethylene terephthalate (PET) and polyethylene naphthalate (PEN), polyolefins such as polyethylene (PE), polypropylene (PP), polystyrene, ethylene vinyl acetate (EVA), cycloolefin polymer (COP), and cycloolefin copolymer (COC), a vinyl resin, polycarbonate (PC), polyamide, polyimide, an acrylic resin, triacetyl cellulose (TAC), and polytetrafluoroethylene (PTFE). In view of light transmittance, heat shrinkability, workability, and the like, those including terephthalate (PET), and cycloolefin polymer (COP) and cycloolefin copolymer (COC) are preferable.

In order to reduce a dielectric loss, a dielectric constant of the substrate 20 is preferably 3.2 or less and most preferably 2.4 or less.

As the substrate 20, a treated support subjected to at least one of an atmospheric pressure plasma treatment, a corona discharge treatment, and an ultraviolet irradiation treatment can be used. In a case where the treatments described above are performed, a hydrophilic group such as an OH group is introduced to the front surface of the treated support, adhesiveness to the first conductive layers 30, the first wiring 32, the second conductive layers 40, the second wiring 42, and the antenna 16 is increased. Among the treatments described above, since adhesiveness to the first conductive layers 30, the first wiring 32, the second conductive layers 40, the second wiring 42, and the antenna 16 are increased, an atmospheric pressure plasma treatment is preferable.

The thickness of the substrate 20 is preferably 5 to 350 μm and more preferably 30 to 150 μm. In a case where the thickness is in the range of 5 to 350 μm, light transmittance of the visible light can be obtained as described above, that is, the substrate 20 is visible light transparent and is easily handled.

As the adhesive layer 22, for example, an optically transparent resin such as an optically transparent pressure sensitive adhesive called optically clear adhesive (OCA) or an ultraviolet cured resin called an optically clear resin (OCR) is used.

The protective layers 24 are to protect the first conductive layers 30, the second conductive layers 40, the first wiring 32, the second wiring 42, the transmission line unit 19, and the antenna 16. The configuration of the protective layers 24 is not particularly limited. For example, glass, polycarbonate (PC), polyethylene terephthalate (PET), and an acrylic resin (PMMA) can be used. Hereinafter, polyethylene terephthalate may be simply referred to as PET.

For example, the antenna 16 is provided in the corner portion 12c of the touch sensor unit 12 (see FIG. 1).

The antenna 16 is a monopole antenna. The length of the antenna 16 is suitably determined according to the wavelength of the used electric waves. The length of the antenna 16, for example, is 6 cm at a frequency of 5 GHz and 3 cm at a frequency of 2.4 GHz.

For example, in a case where the antenna 16 is seen from the front surface 12a side of the touch sensor unit 12, the antenna 16 is provided to be overlapped with the first conductive layers 30 and is formed on the surface different from the first conductive layers 30, for example, on the back surface 20b of the substrate 20. Though it is specifically described, the antenna 16 include a pattern 54 (see FIG. 6) including metal fine wires 50 (see FIGS. 6 and 7) and having the plurality of opening portions 52 (see FIG. 6). The antenna 16 is not limited to a monopole antenna, antennae having various configurations according to specifications and the like can be used, and, for example, an electric field-type antenna such as a dipole antenna and a magnetic field-type antenna such as a loop antenna. The magnetic field-type antenna requires 5 μm or greater of the film thickness of the conductive layer in many cases, but the electric field-type antenna can cause the film thickness of the conductive layer to be less than 5 am. In a case where the film thickness of the conductive layer is great, if metallic gloss occurs when viewed from an angle, and the metallic gloss gives an influence on visibility. Therefore, as the antenna 16, the electric field-type antenna is preferable. Antennae using evanescent waves may be used. However, the communicable distance of the antenna using evanescent waves is as short as several meters, and thus the electric field-type antenna is preferable.

The transmission line unit 19 connects the antenna 16 and the control substrate 14. In the substrate 20, the transmission line unit 19 is led from the corner portion 12c of the touch sensor unit 12, through the external side of the first wiring 32, and to the wire connection area 12g in which the first wiring 32 and the second wiring 42 are aggregated. The transmission line unit 19 is connected to the flexible printed wiring substrate 15 in the lower end portion 12e of the touch sensor unit 12. In the transmission line unit 19, for example, those having a microstrip line structure can be used.

With respect to the transmission line unit 19, characteristic impedance consistency and transmission losses have to be considered, and the transmission line unit 19 is set so as to be consistent to preset characteristic impedance.

Subsequently, the antenna 16 is described.

Figure 6:
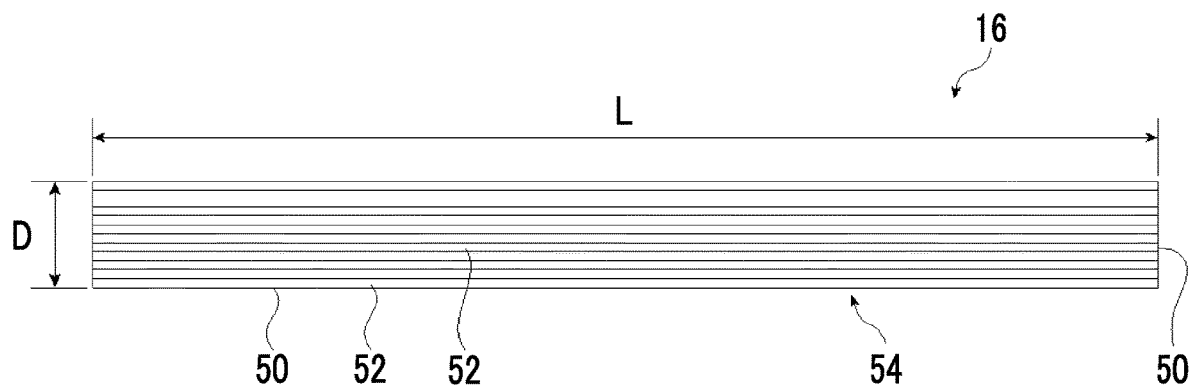
FIG. 6 is a schematic plan view illustrating an antenna of the embodiment according to the present invention.
Figure 7:
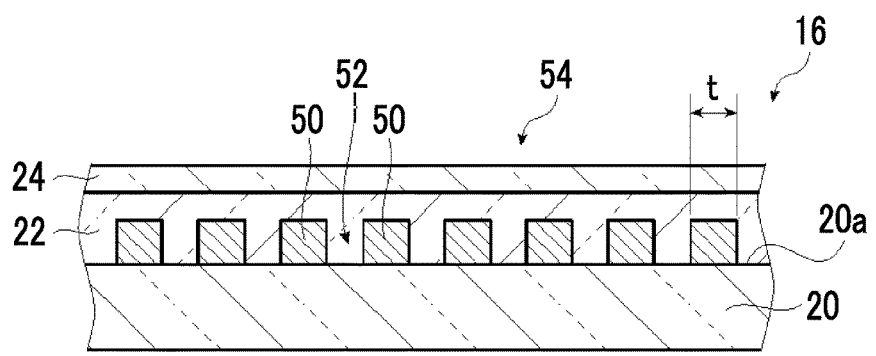
FIG. 7 is a schematic cross-sectional view illustrating an antenna of an embodiment according to the present invention.
Figure 8:
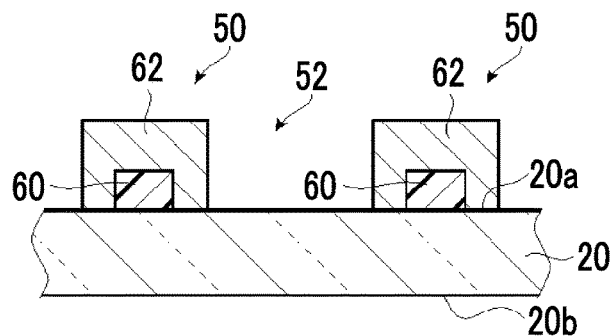
FIG. 8 is a schematic cross-sectional view illustrating an example of metal fine wires included in an antenna.
Figure 9:
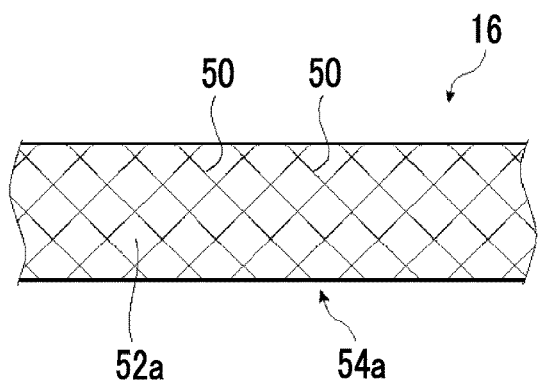
FIG. 9 is a schematic plan view illustrating another example of an antenna having an irregular pattern according to the embodiment of the present invention.
Figure 10:
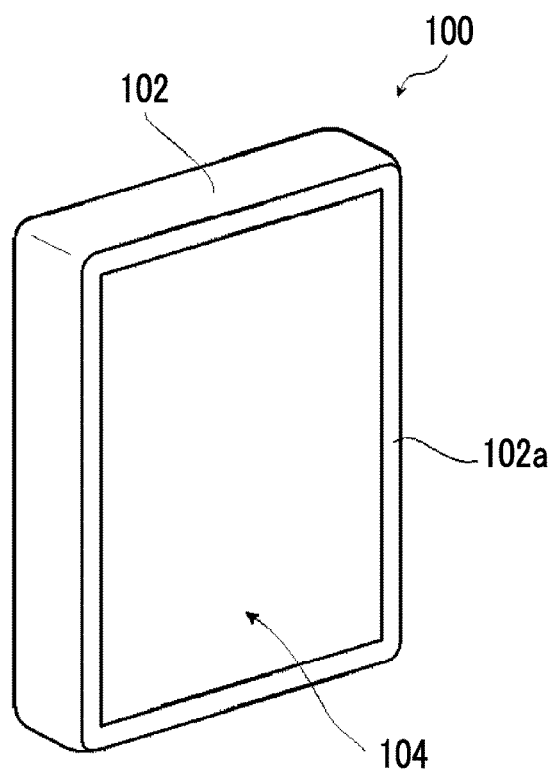
FIG. 10 is a schematic perspective view illustrating a mobile terminal device in the related art.

FIG. 6 is a schematic plan view illustrating an antenna according to an embodiment of the present invention, FIG. 7 is a schematic cross-sectional view illustrating an antenna according to an embodiment of the present invention, FIG. 8 is a schematic cross-sectional view illustrating an example of metal fine wires including an antenna, and FIG. 9 is a schematic plan view illustrating another example of the antenna having the irregular pattern according to the embodiment of the present invention.

As illustrated in FIG. 6, the antenna 16 includes the substrate 20 and the pattern 54 which includes the metal fine wires 50 provided on the front surface 20a of the substrate 20 (see FIG. 7) and has the plurality of opening portions 52. The substrate 20 includes a visible light transparent substrate as described above.

Configurations such as the thickness of the metal fine wire 50 are the same as those of the conductive fine wires 35 except that a line width t (see FIG. 7) is different, and the composition thereof may be the same as described above. Therefore, the descriptions thereof are omitted.

The antenna 16, for example, is a monopole antenna, and has a rectangular shape of which the length is L and the width is D. All of the plurality of opening portions 52 have a rectangular shape, and shapes and sizes thereof are the same.

In the antenna 16, the line width t of the metal fine wire 50 (see FIG. 7) is 0.5 to 5.0 μm. In a case where the line width t is 0.5 to 5.0 μm, visibility of the antenna 16 can be reduced, and the line appearance of the antenna 16 can be suppressed. In a case where the line width t is greater than 5.0 μm, the metal fine wires 50 of the antenna 16 are easily seen. Meanwhile, in a case where the line width t is less than 0.5 μm, the surface electrical resistance of the antenna 16 increases, heat is generated in a case where electric waves are transmitted and received, and thus the characteristics of the antenna 16 are deteriorated.

The line width t of the metal fine wire 50 can be measured by using an optical microscope, a laser microscope, a digital microscope, and the like.

In view of visibility in an oblique direction, the film thickness of the metal fine wire 50 is preferably 0.1 to 10 μm, more preferably 0.3 to 5 μm, and most preferably 0.5 to 4 μm.

In a case where the metal fine wires 50 are subjected to a blackening treatment, the visibility in the oblique direction due to the film thickness is not required to be considered. As the blackening treatment, well-known blackening treatments may be used. A tellurium-containing hydrochloric acid treatment disclosed in JP2015-82178A may be used.

In the antenna 16, an opening ratio is 70% or greater. In a case where the opening ratio is 70% or greater, the visibility of the antenna 16 can be decreased, and the line appearance of the metal fine wires 50 of the antenna 16 can be suppressed. Meanwhile, in a case where the opening ratio is less than 70%, the metal fine wires 50 of the antenna 16 are easily seen.

The opening ratio of the antenna 16 is defined as an unoccupied area ratio of the conductive fine wire in the range of the length L×the width D of the antenna 16.

The opening ratio is obtained by imaging the pattern 54 with an imaging element, obtaining a captured image of the pattern 54, performing a binarization treatment on the captured image, and extracting the metal fine wires 50. An opening ratio can be obtained by obtaining a ratio of the metal fine wires 50 with respect to the area of the length L×the width D of the antenna 16.

The surface electrical resistance of the antenna 16 is 9 Ω/sq. or less.

In view of the characteristics required in the antenna 16, the surface electrical resistance is preferably low, and thus the surface electrical resistance of the metal fine wires 50 is 9 Ω/sq. or less. The lower limit value of the surface electrical resistance of the antenna 16 is preferably 0.001 Ω/sq. The surface electrical resistance of the antenna 16 is preferably 0.01 to 5 Ω/sq. In a case where the surface electrical resistance of the antenna 16 is greater than 9 Ω/sq., heat is generated in a case where electric waves are transmitted and received, and the characteristics of the antenna 16 are deteriorated. If the surface electrical resistance is greater than 9 Ω/sq., in a case where the substrate includes a resin, it is likely that the substrate is deformed due to heat generation in a case where electric waves are transmitted and received.

It is preferable that the metal fine wires 50 include copper. In this case, in addition to the single substance of copper, copper including a binder may be used.

The surface electrical resistance is a resistance value obtained by cutting the antenna 16 to be measured in a width of 10 mm, bonding a conductive copper tape at both ends thereof such that the length of the antenna 16 becomes 10 mm, and measuring the resistance at both ends thereof by using a multimeter 34405A manufactured by Agilent Technologies, Inc.

The composition of the metal fine wires 50 is metal including an alloy as described above. In a case where the metal fine wires 50 are specifically described, the composition of the metal fine wires 50 include a single metal element or a plurality of metal elements, and does not include oxide by 20 mass % or greater. In a case where a plurality of metal elements are included, an alloy may be used, or a plurality of kinds of metal may exist independently. The metal fine wires 50 is not limited to the configuration only including a metal element, and metal particles and a binder may be included. The metal particles may include a single metal element, and may include an alloy consisting of a plurality of metal elements. A plurality of kinds of metal including a single metal element may be used. Oxide having conductivity such as indium tin oxide (ITO) and a resin and the like having conductivity are not included in the metal fine wires 50.

The metal fine wires 50 are not limited to metal fine wires including metal or an alloy described above and metal fine wires including a binder together with metal or an alloy. For example, the metal fine wires 50 can be formed by a method of forming metal fine wires by performing a plating treatment only to a portion in which metal fine wires are desired to be formed. In this case, as illustrated in FIG. 8, the metal fine wires 50 includes plated layers 60 and metal layers 62 which are formed on the front surface 20a of the substrate 20, and the plated layer 60 is covered with the metal layers 62. In addition, though not illustrated, the metal fine wires 50 may have an aspect in which the metal layers 62 are provided only on the upper surface of the plated layer 60.

As illustrated in FIG. 8, in the aspect in which the plated layer 60 is covered with the metal layers 62, the metal layers 62 has metallic gloss. However, in a case where the metal fine wires 50 are seen from the back surface 20b side of the substrate 20, the plated layer 60 is seen as black. Therefore, visibility of the metal fine wires 50 decreases in a case of being seen from the plated layer 60 side compared with a case of being seen from the front surface 20a side of the substrate 20, that is, from the metal layers 62 side. That is, the metal fine wires 50 are hardly seen.

Figure 4:
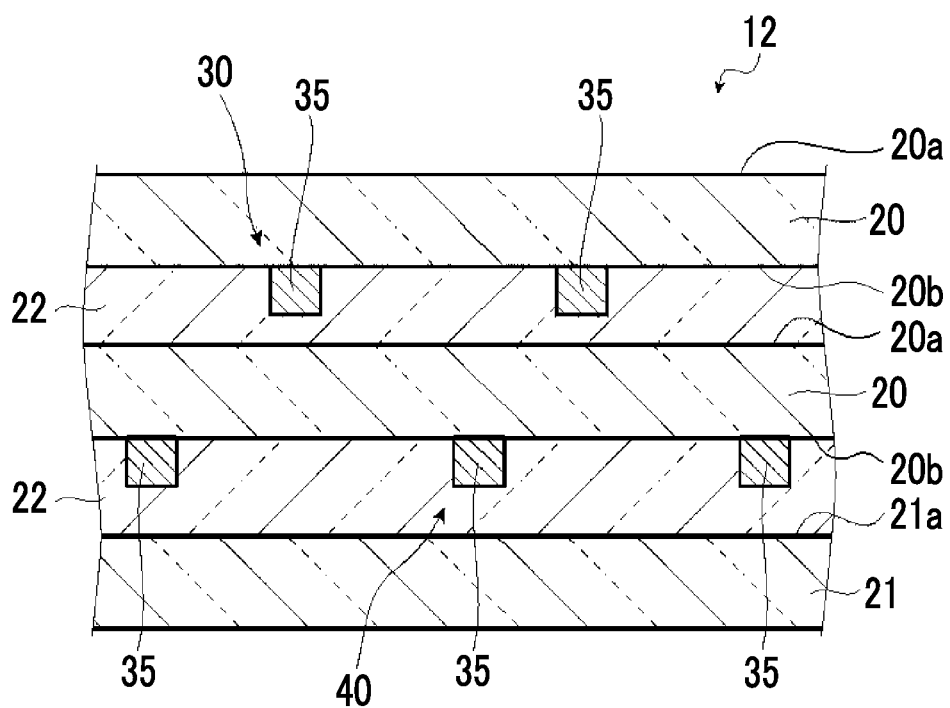
FIG. 4 is a schematic cross-sectional view illustrating another example of the touch sensor panel of the embodiment according to the present invention.

The conductive fine wires 35 have the same configuration as the metal fine wires 50. Also in the conductive fine wires 35, in the same manner as in the metal fine wires 50, visibility on the plated layer 60 side is different from the metal layers 62 side. In a case of being seen from the plated layer 60, visibility of the conductive fine wires 35 decreases. That is, the conductive fine wires 35 are hardly seen. Therefore, compared with in the configuration of the touch sensor unit 12 of FIG. 3 described above, in the configuration of the touch sensor unit 12 illustrated in FIG. 4, the visibility of the conductive fine wires 35 decreases. That is, the conductive fine wires 35 are hardly seen. In view of visibility, the configuration of the touch sensor unit 12 illustrated in FIG. 4 is preferable.

The shape of the opening portion of the antenna 16 is not particularly limited to the pattern 54 as illustrated in FIG. 6, as long as the shape satisfies the line width t (see FIG. 7), the opening ratio, and the surface electrical resistance described above. For example, as illustrated in FIG. 9, the shape may be a pattern 54a having rhombus opening portions 52a. In addition to a rectangle and a rhombus, the opening portion may be a triangle, a square, a parallelogram, a pentagon, a hexagon, or a random polygonal shape, and a portion of sides forming the polygonal shape may be a curved line.

Considering heat dissipation in a case of using the antenna 16, the pattern 54 illustrated in FIG. 6 is preferable.

Here, in a state in which the first conductive layers 30 and the second conductive layers 40 which function as detection electrodes, the opening ratio on the front surface 20a side of the substrate 20 of the touch sensor unit 12 and the opening ratio of the antenna 16 may be identical to or different from each other. That is, there may be two areas having different opening ratios. The opening ratios of the antenna 16 and the first conductive layers 30 and the second conductive layers 40 which function as detection electrodes may be suitably determined according to the required performances.

The opening ratio in a state in which the first conductive layers 30 and the second conductive layers 40 which function as the detection electrodes described above are overlapped with each other is simply referred to as an opening ratio of the touch sensor unit 12.

The plurality of antennae 16 may be provided. In this case, the antennae 16 may be provided in an upper end portion 12h or a side end portion 12f of the touch sensor unit 12. As illustrated in FIG. 2, in the upper end portion 12h or the side end portion 12f of the touch sensor unit 12, the antennae 16 may be provided so as to be overlapped with the first conductive layers 30 and the second conductive layers 40 of the sensor unit 18a. In this case, the antenna 16 is provided on the same surface of the first conductive layers 30 or the second conductive layers 40, in an area in which the first conductive layers 30, the first wiring 32, the second conductive layers 40, or the second wiring 42 is not formed.

In a case where the plurality of antennae 16 are provided, the antennae may be the same kind of antennae and may be different kinds of antennae, and the antennae are not particularly limited. In a case where the plurality of antennae are provided, the opening ratios of the respective antennae may be identical to or different from each other. The opening ratios of the respective antennae may be identical to or different from that of the touch sensor unit 12. In this manner, the opening ratios of the touch sensor unit 12 and the respective antennae are different from each other, and there may be three or more areas having different opening ratios.

In view of reception sensitivity, the antenna 16 is preferably far from the end portion of the touch sensor. In this case, the antenna 16 is preferably provided inside of the touch sensor unit 12, that is, on the second wiring 42 side of the lower end portion 12e. Specifically, the antenna 16 is separated from the end portion of the touch sensor preferably by 0.5 cm or greater, more preferably by 1 cm or greater, and most preferably by 2 cm or greater. In this case, the expression "separating" means a linear distance in which the distance between the touch sensor end portion and the antenna 16 is the closest.

In the touch sensor panel 10, the antenna 16 has low visibility as described above, and thus even in a case where the antenna 16 is provided in an area corresponding to the opening portion 11a of the housing 11 in the touch sensor unit 12, the antenna 16 is suppressed from being seen as the touch sensor unit 12. Therefore, the antenna 16 can be provided in an area corresponding to the opening portion 11*a* of the housing 11, the occupation of the volume of the mobile terminal device 17 of the antenna 16 can be reduced.

The antenna 16 having low surface electrical resistance and satisfactory sensitivity can be obtained.

In this manner, the antenna 16 having satisfactory sensitivity can be provided in an area corresponding to the opening portion 11*a* of the housing 11, and thus the frame portion 11*b* of the housing 11 can be narrowed down. Even in a case where a display area of the mobile terminal device 17 is small, the antenna 16 can be provided, and thus the mobile terminal device 17 can be minimized.

As described above, the antenna 16 can be provided in an area corresponding to the opening portion 11*a* of the housing 11, and further may be provided so as to be overlapped with the first conductive layers 30 and the second conductive layers 40, and thus a degree of freedom of the position of the antenna 16 is high. Here, as described above, in a case where the frame portion 11*b* is grabbed, the sensitivity of the antenna 16 is prominently decreased by causing the antenna 16 to come close to the frame portion 11*b*. However, since the antenna 16 may be provided in the center of the touch sensor unit 12, the sensitivity of the antenna 16 can be suppressed from being decreased.

Since the occupation of the volume of the mobile terminal device 17 of the antenna 16 is small, the plurality of antennae 16 may be provided in an area corresponding to the opening portion 11*a* of the housing 11.

The first conductive layers 30, the first wiring 32, and the antenna 16 are formed on the same surface, and thus, in a case where the first conductive layers 30 and the first wiring 32 are formed by using exposure, the first conductive layers 30, the first wiring 32, and the antenna 16 can be collectively formed by causing exposure patterns to be patterns of respective units. Accordingly, the manufacturing step can be simplified, and thus the manufacturing cost can be suppressed. These can be formed of the same material. These can be formed to have the same thickness.

In a case where the first conductive layers 30, the first wiring 32, the second conductive layers 40, and the second wiring 42 are formed on the substrate 20 by simultaneously exposing the both surfaces, the second conductive layers 40 and the second wiring 42 can be collectively formed, production efficiency can be further increased, and thus the manufacturing cost can be further suppressed. The forming can be performed such that the thicknesses thereof are the same.

Here, the expression "same material" means that the kinds and the content of the composition components are the same. The expression "same" means that kinds of the composition components are the same, and the contents thereof are allowable in the range of +10%. For example, in a case where forming is performed in the same step with the same material, it is called "the same material", and the composition and the content can be measured by using an X-ray fluorescence analyzer.

Obviously, the first conductive layers 30, the first wiring 32, the second conductive layers 40, the second wiring 42, the antenna 16, and the transmission line unit 19 are not limited to be formed with the same material, and may be formed of different materials and in different thicknesses.

The antenna 16 is provided on the same substrate 20 as the touch sensor unit 12, but the present invention is not limited thereto, and the antenna 16 may be a single substance. In this case, only the pattern 54 including the antenna 16 is formed in the substrate 20.

The method of forming the first conductive layers 30, the first wiring 32, the second conductive layers 40, the second wiring 42, the antenna 16, and the transmission line unit 19 is not particularly limited. For example, a method of forming wiring using a plating method may be used. The plating method may be only electroless plating, or electrolytic plating may be performed after electroless plating. As the wiring forming method using the plating method, the additive method can be used.

Hereinafter, as the method of forming the first conductive layers 30, the first wiring 32, the second conductive layers 40, the second wiring 42, the antenna 16, and the transmission line unit 19, for example, a method of forming metal fine wires is described. The method of forming metal fine wires may be the same method of forming the first conductive layers 30, the first wiring 32, the second conductive layers 40, the second wiring 42, the antenna 16, and the transmission line unit 19 of the touch sensor panel 10, except that the patterns are different, and can be applied to these formations. Here, the metal fine wire is a generic term of the metal fine wires 50, and the conductive fine wires 35 including metal or an alloy.

The method of forming the metal fine wire is not particularly limited, and well-known methods can be employed. An additive method or a subtractive method may be used, but in view of productivity, an additive method is preferable. The additive method is a method of forming metal fine wires by applying a plating treatment or the like to only a portion of a visible light transparent substrate on which metal fine wires are desired to be formed. The subtractive method is a method in which a conductive layer is formed on a visible light transparent substrate and unnecessary portions are removed by an etching treatment (for example, a chemical etching treatment) so as to form metal fine wires.

Specifically, examples of the method of forming the metal fine wires include a dry process such as a vapor deposition process and a wet process such as a plating treatment. Among these, in view of manufacturing suitability, it is preferable to form metal fine wires by a plating treatment. Particularly, in a case where metal fine wires containing copper are formed, a copper plating treatment is preferably performed, an electroless copper plating treatment is more preferably performed.

One of the suitable aspect of the method of forming metal fine wires includes an aspect of using a plated layer. Specifically, a patterned plated layer having a predetermined pattern is formed on a visible light transparent substrate by using a composition for forming a plated layer, and then metal fine wires can be formed on the patterned plated layer by performing a plating treatment. The patterned plated layer is, generally, are provided on a portion (area) in which metal fine wires are formed on the visible light transparent substrate.

The pattern of the patterned plated layer corresponds to patterns of the first conductive layers 30, the second conductive layers 40, the edge part wiring unit 18*b*, the transmission line unit 19, and the antenna 16, and is suitably determined according to the configurations of the first conductive layers 30, the second conductive layers 40, the edge part wiring unit 18*b*, the transmission line unit 19, and the antenna 16.

Hereinafter, a suitable aspect described above is described below.

The composition for forming the plated layer is preferably a composition that can form a predetermined patterned plated layer by being exposed by light irradiation and is preferably a composition including Compound X or Composition Y.

Compound X: A functional group that interacts with a plating catalyst or a precursor thereof (hereinafter also simply referred to as an "interacting group") and a compound having a polymerizable group.

Composition Y: A composition including a compound having a functional group that interacts with a plating catalyst or a precursor thereof or a compound having a polymerizable group.

Hereinafter, materials included in the composition for forming a plated layer are described.

(Compound X)

Compound X is a compound having an interacting group and a polymerizable group.

The interacting group means a functional group that can interact with a plating catalyst or a precursor thereof. For example, a functional group that can form electrostatic interaction with a plating catalyst or a precursor thereof, or a nitrogen-containing functional group, a sulfur-containing functional group, and an oxygen-containing functional group that can perform coordination formation with a plating catalyst or a precursor thereof can be used.

Specific examples of the interacting group include a nitrogen-containing functional group such as an amino group, an amide group, an imide group, a urea group, a tertiary amino group, an ammonium group, an amidino group, a triazine ring, a triazole ring, a benzotriazole group, an imidazole group, a benzimidazole group, a quinoline group, a pyridine group, a pyrimidine group, a pyrazine group, a nazoline group, a quinoxaline group, a purine group, a triazine group, a piperidine group, a piperazine group, a pyrrolidine group, a pyrazole group, an aniline group, a group containing an alkylamine structure, a group containing an isocyanuric structure, a nitro group, a nitroso group, an azo group, a diazo group, an azide group, a cyano group, or, a cyanate group; an oxygen-containing functional group such as an ether group, a hydroxyl group, a phenolic hydroxyl group, a carboxylic acid group, a carbonate group, a carbonyl group, an ester group, a group containing an N-oxide structure, a group containing an S-oxide structure, or a group containing an N-hydroxy structure; a sulfur-containing functional group such as a thiophene group, a thiol group, a thiourea group, a thiocyanuric acid group, a benzthiazole group, a mercaptotriazine group, a thioether group, a thioxy group, a sulfoxide group, a sulfone group, a sulfite group, a group containing a sulfoximine structure, a group containing a sulfoxinium salt structure, a sulfonic acid group, or a group containing a sulfonic acid ester structure; a phosphorus-containing functional group such as a phosphate group, a phosphoramido group, a phosphine group, or a group containing a phosphoric acid ester structure; and a group containing a halogen atom such as chlorine or bromine, and in the case of a functional group having a salt structure, salts thereof can also be used.

Among these, since polarity is high and adsorption ability to a plating catalyst or a precursor thereof is high, an ionic polar group such as a carboxylic acid group, a sulfonic acid group, a phosphate group, or a boronic acid group, an ether group, or a cyano group is particularly preferable, and a carboxylic acid group (a carboxyl group) or a cyano group is even more preferable.

Two or more kinds of interacting groups may be included in Compound X.

The polymerizable group is a functional group that can form a chemical bond by applying energy, and examples thereof include a radically polymerizable group or a cationically polymerizable group. Among these, in view of excellent reactivity, a radically polymerizable group is preferable. Examples of the radically polymerizable group include an unsaturated carboxylic acid ester group such as an acrylic acid ester group (acryloyloxy group), a methacrylic acid ester group (methacryloyloxy group), an itaconic acid ester group, a crotonic acid ester group, an isocrotonic acid ester group, or a maleic acid ester group, a styryl group, a vinyl group, an acrylamide group, or a methacrylamide group. Among these, a methacryloyloxy group, an acryloyloxy group, a vinyl group, a styryl group, an acrylamide group, or a methacrylamide group is preferable.

Two or more kinds of polymerizable groups may be included in Compound X. The number of polymerizable groups included in Compound X is not particularly limited, and may be one or may be two or more.

Compound X may be a low molecular weight compound or may be a high molecular weight compound. The low molecular weight compound means a compound having a molecular weight of less than 1,000, and the high molecular weight compound means a compound having a molecular weight of 1,000 or greater.

The low molecular weight compound having the polymerizable group corresponds to a so-called monomer. The high molecular weight compound may be a polymer having a predetermined repeating unit.

The compound may be used singly or two or more kinds thereof may be used in combination.

In a case where Compound X is a polymer, a weight-average molecular weight of the polymer is not particularly limited. In view of solubility and excellent handleability, the weight-average molecular weight is preferably 1,000 to 700,000 and even more preferably 2,000 to 200,000. Particularly, in view of polymerization sensitivity, the weight-average molecular weight is preferably 20,000 or greater.

The method of synthesizing the polymer having a polymerizable group and an interacting group is not particularly limited, and a well-known synthesis method (see paragraphs [0097] to [0125] of JP2009-280905A) is used.

Examples of a preferable aspect of the polymer include a copolymer including a repeating unit (hereinafter, suitably also referred to as a polymerizable group unit) having a polymerizable group represented by Formula (a) and a repeating unit (hereinafter, suitably also referred to as an interacting group unit) having an interacting group represented by Formula (b).

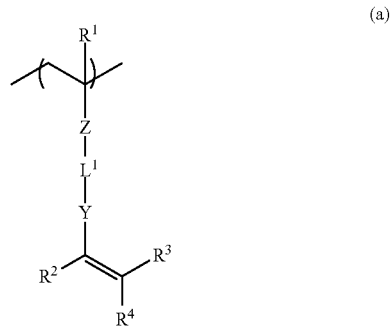

(a)

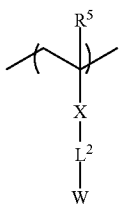
(b)

In Formulae (a) and (b), $R^1$ to $R^5$ each independently represent a hydrogen atom, or a substituted or unsubstituted alkyl group.

$R^1$ is preferably a hydrogen atom, a methyl group, or a methyl group substituted with a bromine atom. $R^2$ is preferably a hydrogen atom, a methyl group, or a methyl group substituted with a bromine atom. $R^3$ is preferably a hydrogen atom. $R^4$ is preferably a hydrogen atom. $R^5$ is preferably a hydrogen atom, a methyl group, or a methyl group substituted with a bromine atom.

In Formulae (a) and (b), X, Y, and Z each independently represent a single bond or a substituted or unsubstituted divalent organic group. Examples of the divalent organic group include a substituted or unsubstituted divalent aliphatic hydrocarbon group (preferably having 1 to 8 carbon atoms, for example, an alkylene group such as a methylene group, an ethylene group, or a propylene group), a substituted or unsubstituted divalent aromatic hydrocarbon group (preferably having 6 to 12 carbon atoms, for example, phenylene group), —O—, —S—, —SO$_2$—, —N(R)— (R: alkyl group), —CO—, —NH—, —COO—, —CONH—, or a group obtained by combining these (for example, an alkyleneoxy group, an alkyleneoxycarbonyl group, or an alkylene carbonyloxy group).

Since a polymer is easily synthesized, and adhesiveness of the metal layer is excellent, X, Y, and Z are preferably a single bond, an ester group (—COO—), an amide group (—CONH—), an ether group (—O—), or a substituted or unsubstituted divalent aromatic hydrocarbon group, and more preferably a single bond, an ester group (—COO—), or an amide group (—CONH—).

In Formulae (a) and (b), $L^1$ and $L^2$ each independently represent a single bond or a substituted or unsubstituted divalent organic group. The definition of the divalent organic group is the same meaning as the divalent organic group described above in X, Y, and Z.

Since a polymer is easily synthesized, and adhesiveness of the metal layer is excellent, $L^1$ is preferably an aliphatic hydrocarbon group or a divalent organic group (for example, an aliphatic hydrocarbon group) having a urethane bond or a urea bond. Among these, a group of which the total number of carbon atoms is 1 to 9 is preferable. Here, the total number of carbon atoms of $L^1$ means a total number of carbon atoms included in the substituted or unsubstituted divalent organic group represented by $L^1$.

Since adhesiveness of the metal layer is excellent, $L^2$ is preferably a single bond, a divalent aliphatic hydrocarbon group, a divalent aromatic hydrocarbon group, or a group obtained by combining these. Among these, $L^2$ is preferably a single bond, or a group of which the total number of carbon atoms is 1 to 15, and particularly preferably unsubstituted. Here, the total number of carbon atoms of $L^2$ means the total number of carbon atoms included in a substituted or unsubstituted divalent organic group represented by $L^2$.

In Formula (b), W represents an interacting group. The definition of the interacting group is as described above.

In view of reactivity (curability and polymerizability) and suppression of gelation in a case of synthesis, the content of the polymerizable group unit is preferably 5 to 50 mol % and more preferably 5 to 40 mol % with respect to the entire repeating unit of the polymer.

In view of absorptivity to a plating catalyst or a precursor thereof, the content of the interacting group unit is preferably 5 to 95 mol % and more preferably 10 to 95 mol % with respect to the entire repeating unit in the polymer.

(Composition Y)

Composition Y is a composition including a compound having an interacting group and a compound having a polymerizable group. That is, the plated layer forming layer includes two kinds of a compound having an interacting group and a compound having a polymerizable group. The definitions of the interacting group and the polymerizable group are as described above.

The compound having an interacting group is a compound having an interacting group. The definition of the interacting group is as described above. The compound may be a low molecular weight compound or may be a high molecular weight compound. The suitable aspect of the compound having an interacting group include a polymer (for example, a polyacrylic acid) having a repeating unit represented by Formula (b). A polymerizable group is not included in the compound having an interacting group.

An acid value of the compound having an interacting group is not particularly limited. However, in view of excellent interaction with the plating catalyst or a precursor thereof, the acid value thereof is preferably 3 mg/KOH or greater and more preferably 10 mg/KOH or greater. The upper limit thereof is not particularly limited, but the acid value is 30 mg/KOH or less in many cases.

The compound having a polymerizable group is a so-called monomer. Since the hardness of the formed plated layer becomes excellent, the compound is preferably a polyfunctional monomer having two or more polymerizable groups.

Specifically, in the polyfunctional monomer, a monomer having two to six polymerizable groups is preferably used. In view of the mobility of molecules in the crosslinking reaction that have an influence on reactivity, the molecular weight of the used polyfunctional monomer is preferably 150 to 1,000 and more preferably 200 to 700. The interval (distance) between a plurality of existing polymerizable groups is preferably 1 to 15 and more preferably 6 to 10 by the number of atoms.

As the compound having a polymerizable group, two or more kinds of monomers may be used, and, for example, a monofunctional monomer and a polyfunctional monomer may be used in combination.

Among the polyfunctional monomers, the hardness of the formed patterned plated layer is more excellent, polyfunctional (meth)acrylamide is preferably used.

Polyfunctional (meth)acrylamide is not particularly limited as long as a group has two or more (preferably two to six) (meth)acrylamide groups.

In view of more excellent effect according to the present invention, one suitable aspect of the polyfunctional monomer include a compound Formula (X).

Formula (X)

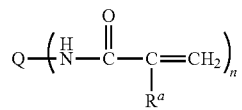

In Formula (X), Q represents an n-valent linking group and $R^a$ represents a hydrogen atom or a methyl group. n represents an integer of 2 or greater.

$R^a$ represents a hydrogen atom or a methyl group, and preferably represents a hydrogen atom.

A valence n of Q is 2 or greater, preferably 2 to 6, more preferably 2 to 5, and more preferably 2 to 4, in view of exhibiting a more excellent effect of the present invention.

Examples of the n-valent linking group represented by Q include a group represented by Formula (1A) and a group represented by Formula (1B).

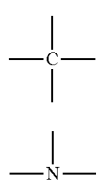

Examples thereof include —NH—, —NR (R: represents an alkyl group)-, —O—, —S—, a carbonyl group, an alkylene group, an alkenylene group, an alkynylene group, a cycloalkylene group, an aromatic group, a heterocyclic group, and a group obtained by combining these.

As the compound represented by Formula (X), paragraphs [0019] to [0034] of JP2013-43946A and paragraphs [0070] to [0080] of JP2013-43945A can be suitably referred to.

Examples of the suitable aspect of the compound represented by Formula (X) include a compound represented by Formula (Y), in view of exhibiting an excellent effect according to the present invention.

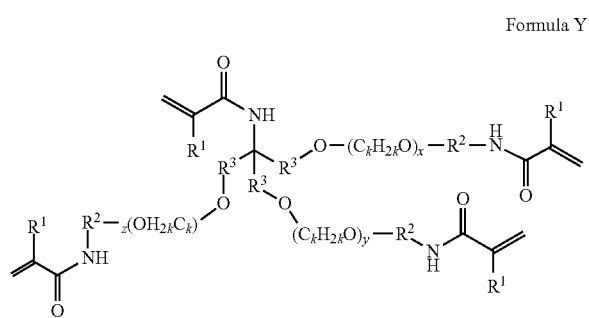

Formula Y

In Formula (Y), $R^1$ represents a hydrogen atom or a methyl group. $R^2$ represents a linear or branched alkylene group having 2 to 4 carbon atoms. Here, $R^2$ is not required to have a structure in which the oxygen atom and the nitrogen atom bonded to both ends of $R^2$ are bonded to the same carbon atom of $R^2$. $R^3$ represents a divalent linking group. k represents 2 or 3. x, y, and z each independently represents an integer of 0 to 6, and x+y+z satisfies 0 to 18.

$R^2$ represents a linear or branched alkylene group having 2 to 4 carbon atoms. A plurality of $R^2$'s may be identical to or different from each other. $R^2$ is preferably an alkylene group having 3 to 4 carbon atoms, more preferably an alkylene group having 3 carbon atoms, and particularly preferably a linear alkylene group having 3 carbon atoms. The alkylene group of $R^2$ may further have a substituent, and examples of the substituent include an aryl group and an alkoxy group.

Here, $R^2$ is not required to have a structure in which the oxygen atom and the nitrogen atom bonded to both ends of $R^2$ are bonded to the same carbon atom of $R^2$. $R^2$ is a linear or branched alkylene group that links an oxygen atom and a nitrogen atom of a (meth)acrylamide group. In a case where this alkylene group has a branched structure, it may be considered that the alkylene group may have an —O—C—N— structure (a hemiaminal structure) in which an oxygen atom and a nitrogen atom of a (meth)acrylamide group on both ends are bonded to the same carbon atom in an alkylene group. However, a compound having a structure like this is not included in the compound represented by Formula (Y).

Examples of the divalent linking group of $R^3$ include an alkylene group, an arylene group, a heterocyclic group, or a group consisting of a combination of these, and an alkylene group is preferable. In a case where the divalent linking group is an alkylene group, in this alkylene group, at least one group selected from —O—, —S—, and —$NR^b$— may be included. $R^b$ represents a hydrogen atom or an alkyl group having 1 to 4 carbon atoms.

x, y, and z each independently represents an integer of 0 to 6, is preferably an integer of 0 to 5, and more preferably an integer of 0 to 3. x+y+z satisfies 0 to 18, preferably satisfies 0 to 15, and more preferably satisfies 0 to 9.

Among polyfunctional (meth)acrylamide, since the curing speed of the plated layer precursor layer is excellent, tetrafunctional (meth)acrylamide represented by Formula (4) can be more preferably used.

According to the present invention, (meth)acrylamide is a concept of including acrylamide and methacrylamide.

Examples of tetrafunctional (meth)acrylamide represented by Formula (4) can be manufactured by a manufacturing method disclosed in JP5486536B.

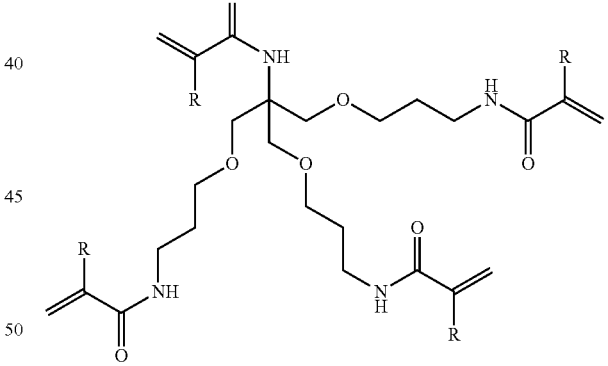

(4)

In a case where a monofunctional monomer is used as the compound having a polymerizable group (a case where a polyfunctional monomer and a monofunctional monomer are used in combination), a compound represented by Formula (1) is particularly preferable.

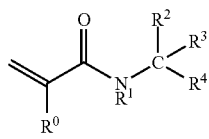

(1)

In Formula (1), $R^0$ represents a hydrogen atom or an alkyl group having 1 to 4 carbon atoms, $R^1$ represents a hydrogen atom or an alkyl group having 1 to 4 carbon atoms, $R^2$, $R^3$, and $R^4$ each independently represent a hydrogen atom, an alkyl group having 1 to 10 carbon atoms, or a hydrocarbon chain partially having a substituent selected from ether, carbonyl, carboxyl, and hydroxy groups.

In Formula (1), $R^0$ represents a hydrogen atom or an alkyl group having 1 to 4 carbon atoms, and is preferably a hydrogen atom or a methyl group.

$R^1$ represents a hydrogen atom or an alkyl group having 1 to 4 carbon atoms and is preferably a hydrogen atom or a methyl group.

$R^2$, $R^3$, and $R^4$ each independently represent a hydrogen atom or an an alkyl group having 1 to 10 carbon atoms, or a hydrocarbon chain partially having a substituent selected from an ether group, a carbonyl group, a carboxyl group, and a hydroxy group.

Examples of the hydrocarbon chain partially having a substituent selected from an ether group, a carbonyl group, a carboxyl group, and a hydroxy group include a hydroxyalkyl group, an alkoxyalkyl group, an acylalkyl group, and a carboxylalkyl group, and the number of carbon atoms included in the substituent described above is not included and is preferably 1 to 5.

$R^2$, $R^3$, and $R^4$ are preferably a hydrogen atom, an alkyl group having 1 to 5 carbon atoms, a hydroxyalkyl group, an alkoxymethyl group, and an acylalkyl group and more preferably a hydrogen atom, a methyl group, an alkyl group having 1 to 3 carbon atoms, a hydroxymethyl group, a butoxymethyl group, and an acylmethyl group (preferably an acetylmethyl group).

An interacting group may be included in the compound having a polymerizable group.

A mass ratio (a mass of the compound having an interacting group/a mass of the compound having a polymerizable group) of a compound having an interacting group and a compound having a polymerizable group is not particularly limited. However, in view of balance between strength and plating suitability of the formed plated layer, the mass ratio is preferably 0.1 to 10 and more preferably 0.5 to 5.

Other components in addition to Compound X and Composition Y may be included in the plated layer forming composition.

For example, a polymerization initiator may be included in the plated layer forming composition.

The polymerization initiator is not particularly limited, and well-known polymerization initiators (for example, a radical polymerization initiator) and the like can be used.

The content of the polymerization initiator in the plated layer forming composition is not particularly limited. However, in view of curability of the plated layer, the content is preferably 0.01 to 5 mass % and more preferably 0.1 to 3 mass % with respect to the total solid content of the plated layer forming composition.

In view of handleability, a solvent (water or an organic solvent) is preferably included in the plated layer forming composition.

The content of the solvent in the plated layer forming composition is not particularly limited, but is preferably 50 to 98 mass % and more preferably 70 to 98 mass % with respect to the total amount of the composition.

A solvent and other additives (for example, a sensitizer, a curing agent, a polymerization inhibitor, an antioxidant, an antistatic agent, a filler, particles, a flame retardant, a surfactant, a lubricant, or a plasticizer) may be added to the plated layer forming composition, if necessary.

The plated layer forming composition is not limited to an aspect described above, and well-known commercially available products (for example, metalloid manufactured by Inokin Co., Ltd.) and hyperbranched polymers that hold and support plating catalysts disclosed in JP2014-159620A can be used.

In a case where the metalloid described above is used, a method of performing Step 2 may be employed by directly coating the visible light transparent substrate with metalloid without performing Step 1 described below so as to form the plated layer.

(Procedure of Manufacturing Metal Fine Wire)

The method of forming metal fine wires preferably includes the following two steps in a case where the plated layer forming composition including Compound X or Composition Y described above is used.

Step 1: Step of forming patterned plated layer by forming a coating film (plated layer precursor layer) by using a plated layer forming composition described above on the visible light transparent substrate, applying energy to this coating film in a patterned shape, and curing the coating film so as to form a patterned plated layer.

Step 2: plating step of forming a metal layer on a patterned plated layer by a plating treatment.

Hereinafter, the procedure of the steps described above is described below.

(Procedure of Step 1)

The method of forming a coating film of the plated layer forming composition on the visible light transparent substrate is not particularly limited, and examples thereof include a method (coating method) of coating the substrate with the plated layer forming composition described above, and the well-known coating method (for example, spin coating, die coating, and dip coating) can be used.

In view of handleability and manufacturing efficiency, an aspect of forming a coating film by coating a substrate with a plated layer forming composition, performing a drying treatment, if necessary, and removing a remaining solvent is preferable.

The conditions of the drying treatment are not particularly limited. In view of excellent productivity, the drying treatment is preferably performed at 220° C. and preferably at 50 to 120° C., for 1 to 30 minutes and preferably for 1 to 10 minutes.

The method of applying energy to the visible light transparent substrate in a pattern shape is not particularly limited.

For example, a heating treatment or an exposure treatment (photoirradiation treatment) is preferably used, and since the treatment is completed for a short period of time, the exposure treatment is preferable. In a case where the energy is applied to a coating film, the polymerizable functional group included in the compound in the coating film is activated, crosslinking between the compounds occur, and curing of the layers proceeds.

In the exposure treatment, light irradiation and the like due to an ultraviolet (UV) lamp, visible rays, and the like is used. Examples of the light source include a mercury lamp, a metal halide lamp, a xenon lamp, a chemical lamp, and a carbon arc lamp. Examples of the radiation include electron beams, X-rays, ion beams, and far infrared rays. Specific aspect thereof suitably include scanning exposure by an infrared laser, high-intensity flash exposure such as a xenon discharge lamp, or infrared lamp exposure.

The exposure time varies according to the reactivity of the compound and the light source, but is generally 10 seconds to 5 hours. The exposure energy may be about 10 to 8,000 mJ and preferably in the range of 50 to 3,000 mJ.

The method of performing the exposure treatment described above in a patterned shape is not particularly limited, and well-known methods are employed. For example, the coating film may be irradiated with exposure light via a mask. In the mask, for example, a mask pattern according to the pattern of the forming antenna is formed.

In a case where the heating treatment by energy application, an air dryer, an oven, an infrared dryer, or a heating drum may be used.

Subsequently, a portion to which the energy application is not performed is removed, so as to form a patterned plated layer.

The removing method described above is not particularly limited, and a suitable method is selected according to the used compound. Examples thereof include a method of using an alkaline solution as a developer. In a case where an area to which energy is not applied is removed by using an alkaline solution, examples thereof include a method of immersing the substrate having the coating film to which energy is applied in a solution and a method of coating the substrate with a developer, and the immersing method is preferable. In a case of the immersing method, the immersion time is preferably 1 minute to 30 minutes in view of productivity and workability.

According to the procedure described above, the patterned plated layer-containing laminate having the visible light transparent substrate and the patterned plated layer provided on the visible light transparent substrate is obtained.

This laminate can be suitably applied to the use of forming the metal fine wires. That is, the metal fine wires can be formed on the patterned plated layer by applying the plating catalyst or the precursor thereof to the patterned plated layer in the laminate and performing the plating treatment. That is, the pattern of the metal fine wire can be controlled by controlling the shape of the patterned plated layer.

(Procedure of Step 2)

The present step is a step of applying the plating catalyst or the precursor thereof to the patterned plated layer in the patterned plated layer-containing laminate, and performing the plating treatment to the patterned plated layer to which the plating catalyst or the precursor thereof is applied, so as to form the metal fine wires on the patterned plated layer.

Hereinafter, the present step is described by dividing into two steps: a step (Step X) of applying the plating catalyst or the precursor thereof to the patterned plated layer and a step (Step Y) of performing a plating treatment to the patterned plated layer to which the plating catalyst or the precursor thereof are applied.

(Step X: Step of Applying Plating Catalyst)

In this step, first, the plating catalyst or the precursor thereof is applied to the patterned plated layer.

The interacting group derived from the compound described above adheres (absorbs) the applied plating catalyst or the applied precursor thereof, according to the function thereof. Specifically, the plating catalyst or the precursor is applied in the patterned plated layer and to the surfaces of the patterned plated layer.

The plating catalyst or the precursor thereof functions as a catalyst or an electrode of the plating treatment.

Therefore, the kinds of the used plating catalyst or the used precursor are suitably determined according to the kind of the plating treatment.

The used plating catalyst or the precursor thereof is preferably the electroless plating catalyst or the precursor thereof. Hereinafter, the electroless plating catalyst or the electroless precursor thereof is described above.

As the electroless plating catalyst used in this step, any electroless plating catalyst can be used as long as the electroless plating catalyst becomes an active nucleus in a case of electroless plating. Specific examples thereof include metal with catalytic ability for autocatalytic reduction reaction (those known as electroless plating metal with lower ionization tendency than Ni). Specific examples thereof include Pd, Ag, Cu, Ni, Pt, Au, or Co. Among these, in view of height of the catalytic ability, Ag, Pd, Pt, or Cu is preferable, and among these, Pd is most preferable.

As this electroless plating catalyst, metal fine particles having a size of 1 to 100 nm or metal colloid may be used.

The electroless plating catalyst precursor used in this step can be used without limitation, as long as the electroless plating catalyst precursor can be an electroless plating catalyst due to the chemical reaction. Mainly, metal ions of the metal exemplified as the electroless plating catalyst are used. The metal ions which are the electroless plating catalyst precursor become zero-valent metal which is an electroless plating catalyst due to reduction reaction. After the application to the patterned plated layer and before the immersion in the electroless plating bath, the metal ion which is the electroless plating catalyst precursor may be changed to zero-valent metal by independent reduction reaction to be used as an electroless plating catalyst.

The electroless plating catalyst precursor without change is immersed in the electroless plating bath and changed to metal (electroless plating catalyst) by a reduction agent in the electroless plating bath.

The metal ions which are the electroless plating catalyst precursor are preferably applied to the patterned plated layer by using metal salt. The used metal salt is not particularly limited as long as the metal salt is dissolved in an appropriate solvent and dissociated into a metal ion and a base (anion), and examples thereof include $M(NO_3)n$, $MCln$, $M_{2/n}(SO_4)$, or $M_{3/n}(PO_4)$ (M represents an n-valent metal atom). As the metal ions, metal ions in which the metal salt described above is dissociated can be suitably used. Examples thereof include an Ag ion, a Cu ion, a Ni ion, a Co ion, a Pt ion, and a Pd ion. Among these, metal ions capable of multidentate coordination are preferable, particularly, an Ag ion, a Pd ion, and a Cu ion are preferable in view of the number of types of functional groups that can perform coordination and catalytic ability thereof, and a Pd ion is most preferable.

In this step, zero-valent metal can also be used as the catalyst used in order to direct performing electroplating without electroless plating.

As the method of applying the plating catalyst or the precursor thereof to the patterned plated layer, for example, a solution obtained by dispersing or dissolving the plating catalyst or the precursor thereof in an appropriate solvent is prepared, and the patterned plated layer may be coated with the solution or the laminate on which the patterned plated layer is formed may be immersed in the solution.

As the solvent described above, water or the organic solvent can be suitably used. As the organic solvent, the solvent that permeates the patterned plated layer is preferable, and examples thereof include acetone, methyl acetoacetate, ethyl acetoacetate, ethylene glycol diacetate, cyclohexanone, acetylacetone, acetophenone, 2-(1-cyclohexenyl) cyclohexanone, propylene glycol diacetate, triacetin, diethylene glycol diacetate, dioxane, n-methyl pyrrolidone, dimethyl carbonate, and dimethyl cellosolve. In a case where metal ions are applied, the potential hydrogen (pH) of the plating catalyst applying solution is preferably 3 to 6 and most preferably 4 to 5.

The concentration of the plating catalyst or the precursor thereof in the solution is not particularly limited, but the concentration thereof is preferably 0.001 to 50 mass % and more preferably 0.005 to 30 mass %.

The contact time is preferably about 30 seconds to 24 hours and more preferably about 1 minute to 1 hour.

The absorption amount of the plating catalyst or the precursor thereof of the patterned plated layer vary according to types of plating bath to be used, types of catalytic metal, types of interacting group of the patterned plated layer, used methods, and the like. However, in view of precipitation properties of the plating, the absorption amount is preferably 5 to 1,000 mg/m$^2$, more preferably 10 to 800 mg/m$^2$, and particularly preferably 20 to 600 mg/m$^2$.

(Step Y: Plating Treatment Step)

Subsequently, a plating treatment is performed on the patterned plated layer to which the plating catalyst or the precursor thereof is applied.

The plating treatment method is not particularly limited, but examples thereof include an electroless plating treatment, or an electrolytic plating treatment (electroplating treatment). In this step, the electroless plating treatment may be singly performed or the electrolytic plating treatment may be performed after the electroless plating treatment is performed.

In this specification, the so-called silver mirror reaction is included as a kind of the electroless plating treatment described above. Accordingly, for example, metal ions deposited may be reduced by a silver mirror reaction or the like to form a desired patterned metal layer, and then the electrolytic plating treatment may be performed.

Hereinafter, the electroless plating treatment and the procedures of the electrolytic plating treatment are described.

The electroless plating treatment refers to an operation of precipitating metal by chemical reaction by using the solution obtained by dissolving metal ions desired to be precipitated as plating.

The electroless plating in this step is preferably performed by washing the laminate including the patterned plated layer to which the electroless plating catalyst is applied with water and immersing the laminate in an electroless plating bath after the remaining electroless plating catalyst (metal) is removed. As the used electroless plating bath, a well-known electroless plating bath can be used.

In a case where the substrate including the patterned plated layer to which the electroless plating catalyst precursor is applied is immersed in the electroless plating bath in a state in which the electroless plating catalyst precursor is absorbed or impregnated in the patterned plated layer, it is preferable to immerse the laminate in an electroless plating bath after the laminate is washed with water and the remaining electroless plating catalyst precursor (metal salt and the like) is removed. In this case, in the electroless plating bath, the reduction of the electroless plating catalyst precursor and subsequently electroless plating is performed. Also, as the electroless plating bath used herein, as described above, the well-known electroless plating bath can be used as described above.

The reduction of the electroless plating catalyst precursor can be performed as an independent step before electroless plating by preparing a catalyst activated solution (reducing solution), independently from the aspect of using the electroless plating solution as described above.

As the composition of a general electroless plating bath, in addition to the solvent (for example, water), 1. metal ions for plating, 2. a reduction agent, and 3. an additive (stabilizer) that improves stability of metal ions are mainly included. In addition to the above, well-known additives such as a plating bath stabilizer may be included in this plating bath.

The immersion time in the electroless plating bath is preferably about one minute to six hours and more preferably one minute to three hours.

According to the present step, in a case where the plating catalyst or the precursor thereof which is applied to the patterned plated layer functions as the electrode, electrolytic plating can be performed on the patterned plated layer to which the catalyst thereof or the precursor thereof is applied.

In a case where the electrolytic plating is performed in the condition in which the line width of the patterned non-plated layer is 10 μm or less, heat is generated in some cases. Therefore, electrolytic plating may not be performed in some cases.

As described above, in the present step, after the electroless plating treatment described above, if necessary, an electrolytic plating treatment can be performed. According to this aspect, the thickness of the formed metal layer can be suitably adjusted.

As the method of electroplating, a method well-known in the related art can be used. Examples of the metal used in the electroplating include copper, chromium, lead, nickel, gold, silver, tin, and zinc. In view of conductivity, copper, gold, and silver are preferable, and copper is more preferable.

A metal layer (plating layer) can be formed on the patterned plated layer by performing the step described above.

The present invention basically has the configuration as described above. In the above, the antenna, the method of manufacturing an antenna, and a touch sensor of the present invention are described in detail, but the present invention is not limited to the embodiment described above. Various modifications and changes may be performed without departing from the gist of the present invention.

EXAMPLES

Hereinafter, the present invention is specifically described with reference to examples, but the present invention is not limited thereto.

In a first example, antennae of Examples 1 to 7 and Comparative Examples 1 to 5 described below were manufactured, and whether each of the antennae functions as an antenna was evaluated by attempting the measurement of resonance frequency, and visibility of the antennae was evaluated by line appearance.

Hereinafter, Examples 1 to 7 and Comparative Examples 1 to 5 are described.

Example 1

Polyacrylic acid (viscosity: 8,000 to 12,000 cp, manufactured by Wako Pure Chemical Industries, Ltd.), a tetrafunctional acrylamide A (a monomer in which all "R's" in Formula (4) were represented by methyl groups, synthesized according to JP5486536B) as a polyfunctional monomer, and monofunctional acrylamide (N-t-butylacrylamide) as a monofunctional monomer were dissolved in isopropanol in a solid mass ratio of 1:0.33:0.33, and then irgacure (registered trademark) 127 (polymerization initiator, manufactured by BASF SE) was dissolved so as to be 5 wt % with respect to the total mass of the polyfunctional monomer and the monofunctional monomer described above, so as to prepare a plated layer forming composition (hereinafter, also referred to as a "composition") in a solid content concentration of 3 mass %.

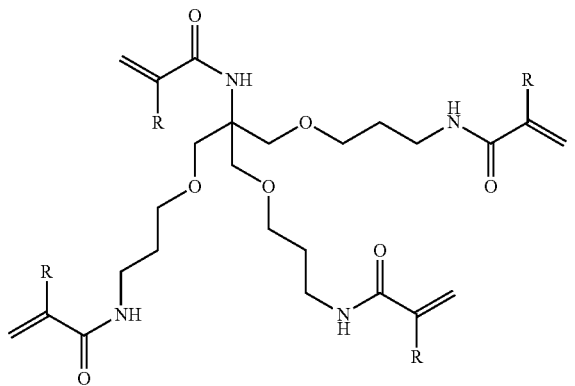

(4)

A hard coat polyethylene terephthalate film (H522 (product name) manufactured by Lintec Corporation) which was a substrate was coated with the obtained composition by using microgravure, so as to form a plated layer precursor layer. The obtained plated layer precursor layer was irradiated with light having a wavelength of 254 nm in an exposure amount of 9 mW/cm$^2$ for 150 seconds by using a parallel exposure machine via a photomask, and a development treatment was performed with an aqueous solution of sodium carbonate, so as to obtain a patterned plated layer (line width: 4±0.3 μm). Thereafter, the patterned plated layer was washed with water and was immersed in a Pd catalyst applying solution (manufactured by Rohm and Haas Company) of which pH was adjusted to 4 to 5 in the condition of 30° C. for five minutes. Subsequently, the patterned plated layer was washed with water and was immersed in a metal catalyst reducing solution (manufactured by Rohm and Hass Company) at 30° C. The patterned plated layer was further washed with water and immersed in a copper plating solution (manufactured by Rohm and Hass Company) at 30° C. for 15 minutes.

As a result, an antenna having a configuration illustrated in FIG. 6 was manufactured by forming a pattern having a copper layer (metal wiring) in which the entire area of the patterned plated layer was covered by copper plating. In the antenna, a pattern with a plurality of opening portions in which the width D was 2 mm, the length L was 130 mm, and 125 metal fine wires having a line width of 4 μm in the range were formed was used.

In a case where the patterned plated layer was observed through a hard coat polyethylene terephthalate film, a black color was seen due to a layer obtained by mixing palladium and copper which was a plating catalyst.

The thickness of the copper layer on the patterned plated layer was 1 μm.

As the antenna, a dipole antenna using the pattern described above was manufactured. The line resistance value of the antenna between 6.5 cm was measured and was 1.8Ω. The surface electrical resistance of the antenna was measured and was 2.0 Ω/sq. The resonance frequency of the antenna was measured and there was a peak at 950 MHz. It was confirmed that the antenna was functioned as an electric field type antenna.

The method of measuring the surface electrical resistance of the antenna was as described above, and thus the detailed description is omitted.

Example 2

Compared with Example 1, Example 2 was the same as Example 1 except that the line width of the metal fine wires was 3 μm, and thus the detailed description is omitted.

Example 3

Compared with Example 1, Example 3 was the same as Example 1 except that the line width of the metal fine wires was 5 μm and the number of metal fine wires was 40, and thus the detailed description is omitted.

Example 4

Compared with Example 1, Example 4 was the same as Example 1 except for using a cycloolefin polymer (dielectric constant: 2.4 at 22° C.) as a substrate instead of the hard coat polyethylene terephthalate film, and thus the detailed description is omitted. In Example 4, a resonance frequency was measured, and a satisfactory result of −23 dB at the frequency of 950 MHz was able to be obtained. The line appearance evaluation was the same as Example 1.

Example 5

Compared with Example 1, Example 5 was the same as Example 1 except for using A4300 (product name: manufactured by Toyobo Co., Ltd.) on the substrate instead of the hard coat polyethylene terephthalate film, and thus the detailed description is omitted. In Example 5, the thickness of the copper layer on the patterned plated layer was 2 μm.

In Example 5, a resonance frequency was measured and a satisfactory result of −24 dB at the frequency of 950 MHz was able to be obtained. The line appearance evaluation was the same as Example 1.

Example 6

Compared with Example 1, Example 6 was the same as Example 1 except that the substrate used in Example 1 was set to a 22 cm×16 cm square size, a touch sensor unit in a 20 cm×15 cm square size was manufactured in the center of the substrate front surface, and, in this case, the same antenna as in Example 1 was manufactured at a position of 0.5 cm on the back surface of the substrate from the end portion of the substrate, and thus the detailed description is omitted.

The pattern of the touch sensor unit was a pattern in which a detection electrode disclosed in FIG. 1 of US2012/0262414A was provided on only one surface of the substrate.

In Example 6, a resonance frequency was measured with a finger on an end portion of the substrate and was −18 dB at the frequency of 950 MHz.

Example 7

Compared with Example 6, Example 7 was the same as Example 6 except for manufacturing the antenna at a position of 2 cm from an end portion of the substrate, and thus the detailed description is omitted.

In Example 7, a resonance frequency was measured with a finger on an end portion of the substrate and was −20 dB at the frequency of 950 MHz.

Comparative Example 1

Compared with Example 1, Comparative Example 1 was the same as Example 1 except for manufacturing a pattern described above in which the line width of the metal fine wires was 4 μm, and the number of metal fine wires was 200 in the manufacturing method using gold fine particles disclosed in Manufacturing Example 1 disclosed in JP2013-257755A in the condition disclosed in Table 1, and thus the detailed description is omitted.

Comparative Example 2

Compared with Comparative Example 1, Comparative Example 2 was the same as Comparative Example 1 except that a line width of the metal fine wires was 6 μm and the number of metal fine wires was 70, and thus the detailed description is omitted.

Comparative Example 3

Compared with Comparative Example 1, Comparative Example 3 was the same as Comparative Example 1 except that a line width of the metal fine wires was 5 μm and the number of metal fine wires was 128, and thus the detailed description is omitted.

Comparative Example 4

Compared with Example 1, Comparative Example 4 was the same as Example 1 except for manufacturing the pattern described above in which a line width of the metal fine wires was m and the number of metal fine wires was 20 based on Example 2 disclosed in WO2006/106982A, and thus the detailed description is omitted. In Comparative Example 4, the film thickness of the metal fine wires was 12 μm.

Comparative Example 5

Compared with Example 1, Comparative Example 5 was the same as Example 1 except that a commercially available indium tin oxide (ITO) film is used, and a pattern in which a line width of the metal fine wires was 5 μm, and the number of metal fine wires was 20 was manufactured by using the photo etching technique described above, and thus the detailed description is omitted. In Comparative Example 5, ITO was used, and thus the film was not metal fine wires, but was called metal fine wire for convenience's sake.

Hereinafter, the method of measuring a resonance frequency and the evaluation thereof, and a method of evaluating visibility of an antenna are described.

(Resonance Evaluation)

With respect to the antenna, the resonance frequency was measured by the following procedure, and the peak frequency of the resonance frequency was attempted. A case where a peak frequency of the resonance frequency was able to be measured was evaluated as "existing" in the "resonance" column presented in Table 1, and a case where a peak frequency of the resonance frequency was not able to be measured was evaluated as "non-existing".

<Method of Measuring Resonance Frequency>

Measurement was performed by using a network analyzer N5230A (model number) manufactured by Agilent Technologies, in a determination device. A Device Under Test (DUT) was connected to Port 1 of this determination device, the characteristic impedance was set to 50Ω, the lower limit was set to 700 MHz, and the upper limit was set to 1,200 MHz, so as to attempt the measurement of the resonance frequency.

In Example 1, the resonance frequency was −20 dB at the frequency of 950 MHz and was in the range of 700 to 1,200 MHz described above and was 0 dB to −5 dB in the range out of the frequency of 950 MHz.

(Line Appearance Evaluation)

With respect to the antenna, line appearance under a sunlight source was observed and was evaluated according to the following evaluation standards. Evaluations A and B were ideal.

The line appearance evaluation was performed by ten subjects and the line appearance was evaluated with the number of people who were able to recognize the reflected light of the metal fine wires of the antenna among the ten subjects.

Evaluation Standard

"A": There were zero people (no one was able to visually recognize) who were able to recognize the reflected light of the metal fine wires. (no one was able to recognize the reflected light)

"B": One to four people were able to recognize the reflected light of the metal fine wires.

"C": Five to nine people were able to recognize the reflected light of the metal fine wires.

"D": Ten people were able to recognize the reflected light of the metal fine wires. (all recognized the reflected light)

The fact that the reflected light of the metal fine wires was able to be recognized can be said that the metal fine wires were seen, and the fact that the reflected light of the metal fine wires was not able to be recognized can be said that the metal fine wires were not seen.

TABLE 1

|  | Line width (μm) | The number of metal fine wires | Opening ratio (%) | Surface electrical resistance (Ω/sq.) | Resonance | Line appearance |
|---|---|---|---|---|---|---|
| Example 1 | 4 | 125 | 75 | 1.0 | presence | A |
| Example 2 | 3 | 125 | 81 | 1.9 | presence | A |
| Example 3 | 5 | 40 | 90 | 2.0 | presence | A |
| Example 4 | 4 | 125 | 75 | 2.0 | presence | A |
| Example 5 | 4 | 125 | 75 | 2.0 | presence | A |
| Example 6 | 4 | 125 | 75 | 2.0 | presence | A |
| Example 7 | 4 | 125 | 75 | 2.0 | presence | A |
| Comparative Example 1 | 4 | 200 | 60 | 15 | presence | C |
| Comparative Example 2 | 6 | 134 | 60 | 14 | presence | D |

TABLE 1-continued

|  | Line width (μm) | The number of metal fine wires | Opening ratio (%) | Surface electrical resistance (Ω/sq.) | Resonance | Line appearance |
|---|---|---|---|---|---|---|
| Comparative Example 3 | 5 | 128 | 68 | 15 | presence | D |
| Comparative Example 4 | 25 | 20 | 75 | 2.1 | presence | D |
| Comparative Example 5 | 5 | 20 | 95 | 50 | absence | A |

As presented in Table 1, in Examples 1 to 7, the resonance frequency was measured, a frequency of 950 MHz was able to be obtained, the antenna functioned as an antenna, visibility was low, and the metal fine wires were not seen. In Examples 1 to 7, electric waves at the frequency of 950 Hz were received, and, even though the reception time was over five minutes, the substrate was not bent due to the heat generation.

In Comparative Example 1, the line width was narrow and an opening ratio was low. In Comparative Example 1, the visibility was high, and metal fine wires were seen. In Comparative Example 1, the surface electrical resistance was high, the frequency of 950 MHz was able to be obtained. However, in a case where electric waves at the frequency of 950 Hz was received, if the reception time was greater than five minutes, heat was generated, the substrate was bent, and the antenna did not sufficiently function as an antenna.

In Comparative Example 2, the line width was wide, and the opening ratio was low. In Comparative Example 2, the visibility was high, and the metal fine wires were seen. In Comparative Example 2, the surface electrical resistance was high, the frequency of 950 MHz was obtained, but, in a case where electric waves at the frequency of 950 Hz was received, if the reception time was greater than five minutes, heat was generated, the substrate was bent, and the antenna did not sufficiently function as an antenna.

In Comparative Example 3, the line width was narrow, and the opening ratio was low. In Comparative Example 3, the visibility was high and the metal fine wire was seen. In Comparative Example 3, the surface electrical resistance was high, and the frequency of 950 MHz was able to be obtained. However, in a case where the electric waves at the frequency of 950 Hz was received, if the reception time was greater than five minutes, heat was generated, the substrate was bent, and the antenna did not sufficiently function as an antenna.

In Comparative Example 4, the line width was wide, and the opening ratio was high. In Comparative Example 4, the frequency of 950 MHz was able to be obtained and the antenna functioned as an antenna. However, the visibility was high, and the metal fine wires were seen. In Comparative Example 4, since the film thickness was 12 μm, in a case where the line appearance was obliquely evaluated, metallic gloss was strongly felt compared with other examples and comparative examples.

In Comparative Example 5, the line width was narrow, and the opening ratio was high, but the surface electrical resistance was high. In Comparative Example 5, Indium Tin Oxide (ITO) was used, visibility was low, and the metal fine wires were not seen. However, the surface electrical resistance was high, and thus the calorific value was high. In Comparative Example 5, in a case where electric waves at the frequency of 950 Hz was received, if the reception time was greater than five minutes, heat was generated, the substrate was bent, and the antenna did not sufficiently function as an antenna.

EXPLANATION OF REFERENCES 10 touch sensor panel
11, 102 housing
11a opening portion
11b frame portion
12 touch sensor unit
12a, 20a front surface
12c corner portion
12e lower end portion
12f side end portion
12g wire connection area
12h upper end portion
13 display device
14 control substrate
15 flexible printed wiring substrate
16 antenna
17, 100 mobile terminal device
18a sensor unit
18b edge part wiring unit
19 transmission line unit
20 substrate
20b back surface
21 substrate
22 adhesive layer
24 protective layer
30 first conductive layer
32 first wiring
35 conductive fine wire
37 cell
39 mesh pattern
40 second conductive layer
42 second wiring
50 metal fine wire
52, 52a opening portion
54, 54a pattern
60 plated layer
62 metal layer
102a frame portion
D width
t line width

What is claimed is:
1. A touch sensor comprising:
a visible light transparent substrate;
a touch sensor unit which is provided on the visible light transparent substrate and which includes at least a detection electrode in which a plurality of opening portions are formed by using conductive fine wires; and at least one antenna which is provided on the substrate,
wherein the antenna has a pattern including metal fine wires and having a plurality of opening portions,
wherein, in the pattern, a line width of the metal fine wires is 0.5 to 5.0 μm, an opening ratio is 70% or greater, and surface electrical resistance is 9 Ω/sq. or less, and
wherein the opening ratio of the opening portions of the touch sensor unit and the opening ratio of the opening portions of the pattern of the antenna are different from each other,
wherein the opening ratio of the antenna is defined as an unoccupied area ratio of the metal fine wires in a range of a length×a width of the antenna, and
wherein the opening ratio of the touch sensor unit is defined as an unoccupied area ratio of the conductive fine wire in the detection electrode.

2. The touch sensor according to claim 1,
wherein a plurality of the antennae are provided,
wherein the touch sensor unit and each of the antennae have different opening ratios, and
wherein three or more areas having different opening ratios are provided.

3. The touch sensor according to claim 1,
wherein, among the conductive fine wires and the metal fine wires, at least the metal fine wires contain copper.

4. The touch sensor according to claim 2,
wherein, among the conductive fine wires and the metal fine wires, at least the metal fine wires contain copper.

5. The touch sensor according to claim 1,
wherein, a width of the conductive fine wires and a width of the metal fine wires are different from each other.

* * * * *